(12) United States Patent
Ferreira et al.

(10) Patent No.: US 9,903,037 B2
(45) Date of Patent: Feb. 27, 2018

(54) PROCESS FOR COATING METALLIC SURFACES WITH COATING COMPOSITIONS CONTAINING PARTICLES OF A LAYERED DOUBLE HYDROXIDE

(71) Applicants: CHEMETALL GMBH, Frankfurt am Main (DE); AIRBUS DEFENCE AND SPACE GMBH, Ottobrunn (DE); MANKIEWICZ GEBR. & CO. (GMBH & CO. KG), Hamburg (DE); UNIVERSIDADE DE AVEIRO, Aveiro (PT)

(72) Inventors: Mario Ferreira, Lissabon (PT); Mikhail Zheludkevich, Aveiro (PT); Joáo Tedim, Aveiro (PT); Valérie Gandubert, Frankfurt (DE); Thomas Schmidt-Hansberg, Usingen (DE); Theo Hack, Höhenkirchen-Siegertsbrunn (DE); Sonja Nixon, München (DE); Dominik Raps, München (DE); Diana Kirsch, Neu-Wulmsdorf (DE); Sven Schröder, Hamburg (DE)

(73) Assignees: Chemetall GmbH, Frankfurt am Main (DE); Airbus Defence and Space GmbH, Ottobrunn (DE); Mankiewicz Gebr. & Co. (GmbH & Co. KG), Hamburg (DE); Universidade De Aveiro, Aveiro (PT)

( * ) Notice: Subject to any disclaimer, the term of this patent is extended or adjusted under 35 U.S.C. 154(b) by 0 days.

(21) Appl. No.: 14/394,429

(22) PCT Filed: Apr. 17, 2013

(86) PCT No.: PCT/EP2013/058032
§ 371 (c)(1),
(2) Date: Oct. 14, 2014

(87) PCT Pub. No.: WO2013/156541
PCT Pub. Date: Oct. 24, 2013

(65) Prior Publication Data
US 2015/0079298 A1 Mar. 19, 2015

(30) Foreign Application Priority Data

Apr. 17, 2012 (PT) .......................... 106256

(51) Int. Cl.
*C25D 15/00* (2006.01)
*C09D 5/10* (2006.01)
(Continued)

(52) U.S. Cl.
CPC ............... *C25D 15/00* (2013.01); *B05D 1/02* (2013.01); *B05D 1/36* (2013.01); *B05D 1/38* (2013.01); *B05D 3/00* (2013.01); *B05D 3/002* (2013.01); *B05D 3/102* (2013.01); *B05D 5/00* (2013.01); *B05D 7/14* (2013.01); *B05D 7/50* (2013.01); *B05D 7/51* (2013.01); *B05D 7/52* (2013.01); *C09D 5/08* (2013.01); *C09D 5/082* (2013.01); *C09D 5/084* (2013.01); *C09D 5/10* (2013.01); *C09D 5/103* (2013.01); *C09D 5/106* (2013.01); *C09D 5/16* (2013.01); *C09D 5/1606* (2013.01);
(Continued)

(58) Field of Classification Search
CPC .......... C09D 5/08; C09D 5/082; C09D 5/084; C09D 5/10; C09D 5/103; C09D 5/106; C09D 5/16; C09D 5/1606; C09D 5/1612; C09D 5/1618; B05D 1/02; B05D 1/36; B05D 1/38; B05D 3/00; B05D 3/002; B05D 3/102; B05D 5/00; B05D 7/14; B05D 7/50; B05D 7/51; B05D 7/52; B05D 2202/00; B05D 2202/10; B05D 2202/15; B05D 2202/25; B05D 2350/00; B05D 2350/60
USPC ........................................ 106/14.05; 427/409
See application file for complete search history.

(56) References Cited

U.S. PATENT DOCUMENTS 4,761,188 A * 8/1988 Miyata .................... C01F 7/002
148/252
4,842,645 A * 6/1989 Miyata ................... C09D 5/084
106/14.14
(Continued)

FOREIGN PATENT DOCUMENTS

DE  10 2009 021069   11/2010
DE  10 2009 021070   11/2010
(Continued)

OTHER PUBLICATIONS

Zheludkevich et al, "Active protection coatings with layered double hydroxide nanocontainers of corrosion inhibitor", Corrosion Science 52 (2010) 602-611.
(Continued)

*Primary Examiner* — William P Fletcher, III
(74) *Attorney, Agent, or Firm* — Nixon & Vanderhye P.C.

(57) ABSTRACT

Coating a metallic surface with at least one of a pretreatment composition prior to organic coating, with a passivation composition without intent for subsequent organic coating, with a pretreatment primer composition, with a primer composition, with a paint composition and with an electro-coating composition, wherein the coating composition includes particles on a base of at least one layered double hydroxide (LDH) phase characterized by the general formula $[M^{2+}_{(1\pm0.5)-x}(M^{3+}, M^{4+})_x(OH)_{2\pm0.75}]A^{n-}_{x/n} \cdot mH_2O$.

29 Claims, No Drawings

(51) Int. Cl.
*C09D 5/08* (2006.01)
*C09D 5/16* (2006.01)
*B05D 7/14* (2006.01)
*B05D 5/00* (2006.01)
*B05D 3/10* (2006.01)
*B05D 7/00* (2006.01)
*B05D 3/00* (2006.01)
*B05D 1/02* (2006.01)
*B05D 1/38* (2006.01)
*B05D 1/36* (2006.01)
*C23C 22/12* (2006.01)
*C23C 22/53* (2006.01)
*C23C 22/60* (2006.01)
*C23F 11/00* (2006.01)
*C09D 5/44* (2006.01)
*C23C 22/68* (2006.01)
*C23C 22/73* (2006.01)
*C25D 9/02* (2006.01)

(52) U.S. Cl.
CPC ......... *C09D 5/1612* (2013.01); *C09D 5/1618* (2013.01); *C09D 5/44* (2013.01); *C23C 22/12* (2013.01); *C23C 22/53* (2013.01); *C23C 22/60* (2013.01); *C23C 22/68* (2013.01); *C23C 22/73* (2013.01); *C23F 11/00* (2013.01); *C25D 9/02* (2013.01); *B05D 2202/00* (2013.01); *B05D 2202/10* (2013.01); *B05D 2202/15* (2013.01); *B05D 2202/25* (2013.01); *B05D 2350/00* (2013.01); *B05D 2350/60* (2013.01); *C23C 2222/20* (2013.01)

(56) References Cited

U.S. PATENT DOCUMENTS

| | | | |
|---|---|---|---|
| 5,266,356 A | 11/1993 | Buchheit, Jr. et al. | |
| 6,383,270 B1 | 5/2002 | Miyazawa et al. | |
| 2003/0078445 A1* | 4/2003 | Fujii | C01F 7/005 556/183 |
| 2005/0022693 A1* | 2/2005 | Sinko | C09C 1/02 106/14.44 |
| 2008/0021115 A1 | 1/2008 | Ikematsu et al. | |
| 2012/0135246 A1 | 5/2012 | Hintze-Brüning et al. | |
| 2012/0264858 A1 | 10/2012 | Hintze-Brüning et al. | |
| 2012/0269978 A1* | 10/2012 | Hintze-Bruning | B05D 5/00 427/407.1 |
| 2012/0321908 A1 | 12/2012 | Hoshino et al. | |
| 2014/0147663 A1 | 5/2014 | Hoshino et al. | |

FOREIGN PATENT DOCUMENTS

| | | |
|---|---|---|
| DE | 10 2009 021071 | 11/2010 |
| EP | 1 069 074 | 1/2001 |
| EP | 1 069 074 A1 * | 1/2001 |
| EP | 1 088 853 | 10/2004 |
| EP | 1 840 113 | 10/2007 |
| EP | 1 840 113 A1 * | 10/2007 |
| EP | 2 505 351 | 10/2012 |
| JP | 11-158436 | 6/1999 |
| JP | 2000-191943 | 7/2000 |
| JP | 2005336002 | 12/2005 |
| JP | 2011-502770 | 1/2011 |
| JP | 2011-131586 | 7/2011 |
| JP | 2012-71490 | 4/2012 |
| KR | 10-2004-0070060 A * | 5/2006 |
| WO | WO2006/068118 | 6/2006 |
| WO | WO2009/062620 | 5/2009 |
| WO | WO 2009/062623 A1 * | 5/2009 |
| WO | WO2010/130308 | 11/2010 |
| WO | WO2010/130312 | 11/2010 |
| WO | WO 2011/065514 | 6/2011 |
| WO | WO 2012/043511 | 4/2012 |

OTHER PUBLICATIONS

International Search Report for PCT/EP2013/058032 dated Jul. 30, 2013.
Written Opinion of the International Searching Authority for PCT/EP2013/058032 dated Jul. 30, 2013.
Translation of Office Action dated Jan. 24, 2017 received in Application No. JP20150506233 (Title: Process for Coating Metallic Surfaces With Coating Compositions Containing Particles of a Layered Double Hydroxide; Applicants: Chemetal GMBH, et al.; filed Oct. 16, 2014).

* cited by examiner

PROCESS FOR COATING METALLIC SURFACES WITH COATING COMPOSITIONS CONTAINING PARTICLES OF A LAYERED DOUBLE HYDROXIDE

RELATED APPLICATIONS

This application is the U.S. national phase of International Application No. PCT/EP2013/058032 filed 17 Apr. 2013 which designated the U.S. and claims priority to Portuguese Patent Application No. 106256 filed 17 Apr. 2012, the entire contents of these applications are incorporated by reference.

BACKGROUND

The invention relates to a process of coating a metallic surface with a composition for coating with a pretreatment composition prior to organic coating, with a passivation composition without intent for subsequent organic coating, with a pretreatmentprimer composition or with a primer composition, with a paint composition or with an electrocoating composition wherein each one composition contains nanoparticles on the base of at least one layered double hydroxide (LDH) phase showing the general formula [1],

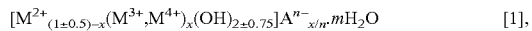
$$[M^{2+}{}_{(1\pm0.5)-x}(M^{3+},M^{4+})_x(OH)_{2\pm0.75}]A^{n-}{}_{x/n}\cdot mH_2O \quad [1],$$

wherein $M^{2+}$, $M^{3+}$ and $M^{4+}$ are divalent, trivalent resp. tetravalent cations, or calcined or calcined and rehydrated particles of this LDH phase. The invention further relates to a method of use of nanoparticles on the base of LDH in aqueous and non-aqueous coating compositions and to the thereof generated coatings.

The processes most commonly employed in surface treatment for metallic surfaces are the treatment of metallic surfaces without intent of subsequent organic coating, often called passivation, especially of parts, coil or coil portions like sheets made of at least one metallic material, and the pretreatment of metallic surfaces prior to organic coating like lacquering or application of adhesives. Such treatments and pretreatments are frequently based on the one hand on the use of chromium(VI) compounds, optionally together with diverse additives, or on the other hand on the base of phosphates like zinc/manganese/nickel phosphates, on the base of Ti and/or Zr containing compounds, on the base of silane/silanol/siloxane and/or on the base of organic polymers/copolymers together with diverse additives.

Primer and paint compositions are typically based on aqueous or non-aqueous compositions with a high content of organic polymer/copolymer. A primer is the first organic coating especially after pretreatment coating with a conversion coating of the first or second type. They are developed in very many chemical variations and used very much.

Pretreatmentprimer compositions are typically based on aqueous or non-aqueous compositions with a high content of organic polymer/copolymer too. A pretreatmentprimer is the first organic coating on a metallic surface, which combines and fulfils the tasks and properties of a pretreatment or passivation composition resp. coating with the tasks and properties of a primer composition respectively primer coating.

Electrocoating (=electrodeposition coating, e-coat, e.g. cathodic) compositions for electrocoating a pretreated metallic surface with an aqueous electroconductive primer composition is in many cases the primer in car-body production. Often, the electrocoating will be a cathodic electrocoating. Such electrocoating compositions contain a small amount of electroconductive substance especially like on the base of copper, indium, lead, tin and/or yttrium. Because of the toxicological and ecological risks associated especially with processes using chromate or nickel, alternatives to these processes in all the areas of surface technology for metallic substrates have been sought for many years, but it has repeatedly been found that, in many applications, completely chromate-free or nickel-free processes do not satisfy 100% of the performance spectrum or do not offer the desired safety, especially in the construction of aircrafts. Attempts are therefore being made to minimize the chromate contents or nickel contents and to replace $Cr^{6+}$ with $Cr^{3+}$ as far as possible. High-quality phosphatizing processes are used especially in the automobile industry, e.g. for the pretreatment of car bodies prior to lacquering, which have maintained the quality of automobile corrosion protection at a high level. Zinc-manganese-nickel phosphatizing processes are conventionally employed for this purpose. In the last years, more and more aqueous compositions on the base of Ti and/or Zr containing compounds, on the base of silane/silanol/siloxane and/or on the base of organic polymers/copolymers have been developed and partially successfully used.

The term "paint" shall mean in the sense of the present invention any paint, any lacquer or any paint-like composition especially adapted to a specific use to coat metallic surfaces which may be used for example as primer, as base coat, as topcoat, as clear coat and/or for coil-coating, but it does not cover pretreatmentprimer, primer and electrocoating compositions. It covers in the same way high solids' paints, water based systems, solvent based systems and primers. The term "pretreatmentprimer" does not cover pretreatment and primer compositions.

For the use in primer and paint compositions, many corrosion inhibiting compounds and mixtures are offered, but many of these are not or not for the amount the corrosion inhibitor should be added sufficiently compatible with the primer or paint composition. If there is an inadequate corrosion inhibitor added to a primer or paint composition or if it is added in an amount that is not compatible with the primer or paint composition, the protected metallic surface may even corrode easier because of this corrosion inhibitor due e.g. blistering effects, lack of barrier properties or loss of adhesion.

The use of silane/silanol/siloxane, water glass or organic polymer/copolymer in aqueous compositions for the production of anticorrosive coatings is known in principle. These coatings are not always formed with outstanding properties. The corrosion protection and the lacquer adhesion of such coatings formed are often high, but not always. But there exist several applications on metallic surfaces, where the requirements for corrosion resistance and/or lacquer adhesion are very high and not yet fulfilled.

It is known from EP 1 088 853 B1 to use Mg—Al-based hydrotalcite-type particles, which may be coated with higher fatty acid, organosilane compound or rosin, as a stabilizer in chlorine-containing resins. Without such stabilizer, these chlorine-containing resins are susceptible to heat deterioration and oxidation degradation.

U.S. Pat. No. 5,266,356 discloses a method for forming lithium rich films which are particle-free LDH based conversion coating films on the surface of Al—Li alloys. In the bath solution, $Li^+$ enters aluminium hydroxide to form a LDH-based phase.

DESCRIPTION OF INVENTION

In the search of self-healing processes for corrosion of metallic surfaces, it was found that there may perhaps occur self-healing processes in the application of coatings showing a content of any type of LDH particles.

There is a need for further processes to generate coatings on metallic surfaces of very high requirements for corrosion resistance and/or lacquer adhesion. The aqueous compositions to generate such coatings should be as environmentally friendly as possible and able to be used in series production, like in automobile production. They may perhaps be used as nearly heavy metal-free coating compositions for multi-metal applications or replacing heavy metal-rich coating compositions used today.

The object was to propose aqueous compositions which are based on an environmentally friendly chemical composition and assure a high corrosion resistance. Further on, it would be helpful, if such compositions would be partially also suitable in multi-metal applications, in which e.g. steel and zinc-rich metallic surfaces and optionally also aluminium-rich metallic surfaces, are treated or pretreated in the same bath. The object was also to propose aqueous compositions that are suitable for coating car-bodies in automobile construction.

It has now been found that the addition of LDH particles to a coating composition helps to increase corrosion resistance and/or paint adhesion significantly, even if only a very small amount of e.g. 1% by weight was added.

It has now been found that a corrosion inhibitor like 2-mercaptobenzothiazole which is not compatible with many primer or paint compositions, may be added to a primer or paint composition when it is bound to LDH particles and generates a superior corrosion resistance. Such "encapsulation" of the corrosion inhibitor enables its addition in relatively high amounts. Such corrosion inhibitor may be released from the LDH particles in changes of the chemical environment near the metal surface, especially when segregated at the coating—metal interphase or in the neighbourhood of impairments of the coating at the metallic surface, so that corrosion resistance may be considerably increased by the release of such corrosion inhibitor. An organic corrosion inhibitor like 2-mercaptobenzothiazole MBT when released from the LDH particles can also migrate through the coating to the outer surface especially of a primer or paint coating and act as water displacing compound by increasing the hydrophobicity.

The object may be achieved with a process of coating a metallic surface with a composition for coating with a pretreatment composition prior to organic coating, with a passivation composition without intent for subsequent organic coating, with a pretreatmentprimer composition, with a primer composition, with a paint composition or with an electrocoating composition, wherein each one liquid coating composition or the thereof generated dry coating contains particles on the base of at least one layered double hydroxide (LDH) phase showing the general formula [1],

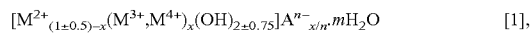
$$[M^{2+}{}_{(1\pm0.5)-x}(M^{3+},M^{4+})_x(OH)_{2\pm0.75}]A^{n-}{}_{x/n}\cdot mH_2O \qquad [1],$$

wherein $M^{2+}$, $M^{3+}$ and $M^{4+}$ are divalent, trivalent resp. tetravalent cations selected from the group consisting of $Ca^{2+}$, $Co^{2+}$, $Cu^{2+}$, $Fe^{2+}$, $Mg^{2+}$, $Mn^{2+}$, $Ni^{2+}$, $Zn^{2+}$, $Al^{3+}$, $Ce^{3+}$, $Co^{3+}$, $Cr^{3+}$, $Fe^{3+}$, $Ga^{3+}$, $V^{3+}$, $Si^{4+}$, $Sn^{4+}$, $Ti^{4+}$ and $Zr^{4+}$, wherein there is no need that cations $M^{3+}$ are present or there is no need that cations $M^{4+}$ are present,
wherein x is the ratio of trivalent plus tetravalent to the sum of divalent, trivalent and tetravalent metal cations $(M^{3+}+M^{4+})/(M^{2+}+M^{3+}+M^{4+})$ which is in the range of from 0.1 to 0.5,
wherein $A^{n-}$ indicates the overall negative charge of intercalated species A with n being in the range of from 0.1 to 100,
wherein these anions A and/or molecules A including assemblies with molecules A are selected from the group consisting of anions of hydroxide, fluorides, carbonates, nitrates, sulfates, chromate, chromite, molybdates, phosphomolybdates, phosphates, phosphonates, tungstates, vanadates, azoles, carboxylates like benzoates, fumarate, lactate, octanoate, oxalate, phthalate, salicylates and succinates, dodecylbenzenes, phenolic compounds, anionic surfactants and biomolecules like proteins and quinaldics,
and/or wherein the coating composition or the thereof generated coating contains their at least partially calcined and/or their partially or totally calcined and then rehydrated LDH particles which are primarily based on a mixture of substances selected from the group consisting of oxides, double oxides, multiple oxides, hydroxides, at least one LDH phase, anions A and molecules A.

The term "layered double hydroxide" (LDH) means that the substance may be a substance of a typical layered double hydroxide crystal structure or of a similar layered double hydroxide crystal structure or may be a modified structure e.g. by at least partially calcining or by partial or total calcining and then rehydrating. All these LDH crystal structures vary strongly from composition, interlayer spacings, geometry, size and/or symmetry of their crystal cells.

The term "LDH particles" in the sense of the present application shall include the normal particles of typical LDH phase and structure, their partially calcined, their totally calcined, their partially calcined and then rehydrated and their totally calcined and then rehydrated LDH particles together with all variations of loading and non-loading the intercalation and of adsorption and non-adsorption of outer surfaces, although the totally calcined LDH particles do not show a typical LDH structure, but their properties result from the possibility to reconstruct the LDH phase. They include synthetic and natural LDH particles.

General formula [1] may be varied e.g. by multiplication with a certain factor. But there remains always an uncertainty about the formula, as there exist quite different crystal structures with LDH properties and intercalation possibilities. On the other hand, the determination of this formula is quite difficult and leaves uncertainties, especially, if one starts determination and calculation from the cations and if one tries then to calculate the anions' content or vice versa. More preferred, x, the ratio of the sum of trivalent plus tetravalent metal cations to the sum of divalent, trivalent and tetravalent metal cations $(M^{3+}+M^{4+})/(M^{2+}+M^{3+}+M^{4+})$, is in the range of from 0.2 to 0.33.

The intercalation is a filling of a LDH phase with anions, solvent molecules and species A like molecules A including assemblies having a molecule into the layers of the crystal structure. The interactions between intercalating species and positively charged LDH sheets are often electrostatic interactions and hydrogen bonding. In some cases chemical bonding and partial grafting of species to the LDH layers can occur.

In general formula [1], m is often in the range of from 0 to 12 molecules of water concerning adsorbed water molecules and intercalated water. Often m is depending on the type of molecule and its dehydration resp. hydration status, especially if it is an aqueous, a wet or a dry sample. The parameter m is such that it corresponds to the total water content in a range of from 1 to 40% by weight, e.g. depending on the storage condition of the particles in powder form. Therefore, m is often a very dynamic value, which can change easily. And m is difficult to be determined correctly, as there is additional water on the particle surface. But in the form of an aqueous dispersion or aqueous paste, the total water content of the LDH phase cannot be determined.

Herein, the cations contained in the LDH particles of a precursor material are selected from the group consisting of $Ca^{2+}$, $Co^{2+}$, $Cu^{2+}$, $Fe^{2+}$, $Mg^{2+}$, $Mn^{2+}$, $Ni^{2+}$, $Zn^{2+}$, $Al^{3+}$, $Ce^{3+}$, $Co^{3+}$, $Cr^{3+}$, $Fe^{3+}$, $Ga^{3+}$, $V^{3+}$, $Si^{4+}$, $Sn^{4+}$, $Ti^{4+}$ and $Zr^{4+}$. They may be used as components e.g. for coprecipitation entering resp. being contained in the positively charged layers of the LDH structure and/or may be present in interlayer spacings of the LDH structure in a very small extent. These interlayer cations may also be released from the interlayer spacings to the surrounding solution by diffusion and/or by direct control of an anion exchange of other intercalating species A.

In more preferred embodiments, the cations are selected from the group consisting of $Ca^{2+}$, $Fe^{2+}$, $Mg^{2+}$, $Mn^{2+}$, $Ni^{2+}$, $Zn^{2+}$, $Al^{3+}$, $Co^{3+}$, $Cr^{3+}$, $Fe^{3+}$, $Ti^{4+}$ and $Zr^{4+}$, are selected from the group consisting of $Fe^{2+}$, $Mg^{2+}$, $Mn^{2+}$, $Zn^{2+}$, $Al^{3+}$, $Ce^{3+}$, $Cr^{3+}$, $Fe^{3+}$, $Ti^{4+}$ and $Zr^{4+}$, are selected from the group consisting of $Fe^{2+}$, $Mg^{2+}$, $Mn^{2+}$, $Ni^{2+}$, $Zn^{2+}$, $Al^{3+}$, $Cr^{3+}$ and $Fe^{3}$ are selected from the group consisting of $Fe^{2+}$, $Mg^{2+}$, $Mn^{2+}$, $Zn^{2+}$, $Al^{3+}$ and $Fe^{3+}$ or are selected from the group consisting of $Mg^{2+}$, $Zn^{2+}$ and $Al^{3+}$.

Herein, the anions A and/or molecules A are preferably selected from the group consisting of anions of hydroxide, fluorides, e.g. monofluoride, bifluoride and complex fluoride of $F_{(5-8)}^{(1-4)-}$, carbonates, e.g. carbonate $CO_3^{2-}$ and hydrogencarbonate $HCO_3^-$, nitrates, e.g. $NO_3^-$, $NO_{(2-3)}^-$ and $NO_2^-$, sulfates, e.g. $SO_4^{2-}$ and $S_2O_7^{2-}$, chromate, chromite, molybdates, e.g. $MoO_4^{2-}$, $MoO_6^{6-}$, oligomolybdates and polymolybdates, phosphomolybdates, e.g. $PMo_{12}O_{40}^{3-}$, phosphates, e.g. $PO_4^{3-}$, $H_xPO_4^{(3-x)-}$, oligophosphates and polyphosphates, phosphonates, e.g. phosphonates and amino-phosphonates like monoaminophosphonate, diaminophosphonate and triaminophosphonate, tungstates, e.g. $WO_4^{2-}$, $WO^{6-}$, oligotungstates or polytungstates, vanadates, e.g. metavanadate $VO_3^-$, divanadate $V_2O_7^{4-}$ and decavanadate $V_{10}O_{28}^{6-}$, azoles, especially thiazoles like e.g. benzothiazole like 2-mercaptobenzothiazole MBT, 2-thiazoline like mercapto-2-thiazoline, triazoles, especially benzotriazoles like 1H-benzotriazole and 2H-benzotriazole and especially benzimidazoles like mercaptobenzimidazole, carboxylates like benzoates, e.g. benzoate and p-benzoylbenzoate, fumarate, lactate, octanoate, oxalate, phthalate, salicylates, e.g. salicylate and thiosalicylate, and succinates, dodecylbenzenes, phenolic compounds, anionic surfactants, e.g. alkyl sulfates, dodecylsulfate, dodecylbenzenesulfate, sulfonates, dodecylsulfonate and dodecylbenzene-sulfonate, phenolic compounds like 1,2-dihydroxybenzene, 8-hydroxychinoline and 1,2,3-trihydroxybenzene and biomolecules like proteins and quinaldics, e.g. quinaldic and hydroxyquinaldics like dodecyl, 8-hydroxiquinoline. The double oxides may be e.g. spinels. These cations, molecules and/or assemblies may be intercalated and/or occurring adsorbed on the outer surfaces of the LDH particles.

Many of these organic compounds are complexing agents. Their molecules form a coordinative linkage with the metallic substrate. They may form a thin organic layer on the metallic substrate, especially with copper atoms of intermetallic phases of copper containing aluminium alloy. Among the aluminium alloys, the copper containing aluminium alloys are well known to show a relatively low corrosion resistance. It is supposed that such organic compounds have not yet been used as corrosion inhibitors in primer and paint compositions, as many of these would react in undesirable way and would impair either the primer or paint composition strongly, especially by changing its viscosity, its possibility to be well applied and/or by changing the adhesion to the surface of the underlying coating, by changing the chemical resistance and/or by changing the storage stability.

Of these anions A especially the following belong to the corrosion inhibiting anions: Complex fluorides, chromate, chromite, molybdates, phosphomolybdates, phosphates, phosphonates, tungstates, vanadates, azoles, carboxylates like benzoates, fumarate, lactate, octanoate, oxalate, phthalate, salicylates and succinates as well as dodecylbenzenes. There are further on anions A known that are not active corrosion inhibiting anions or are very strong functioning corrosion inhibiting anions, which may play nevertheless a certain role in the overall process of corrosion inhibition and may optionally be present too, e.g. as corrosion inhibitors B.

More preferred, the anions A contained in the LDH particles are selected from the group consisting of hydroxides, carbonates, nitrates, sulfates, molybdates, phosphates, phosphomolybdates, vanadates, carboxylic acids' anions and azoles. They may especially be contained in a LDH precursor material.

Even molecules A including molecules A in complexes and micelles (="assemblies") may be incorporated in the layers of the crystal structure of the LDH phase by intercalation, either instead of anions or additionally.

According to this invention, the terms "species", "species A" and "intercalated species A" refer to species selected from the group consisting of inorganic anions A, neutral or negatively charged organic molecules A, neutral or negatively charged inorganic molecules A and assemblies A containing neutral, positively charged or negatively charged species like molecules and ions, but being in total charged in a way that an overall negative charge n is granted. More preferred, the overall net charge of these intercalated species A is in a range of from 1 to 20. According to this invention, the term "molecules A" is to be understood that it comprises molecules, assemblies having a molecule as well as their supporting intermediate species. The molecules A may be neutral, negatively charged or positively charged molecules available in solution. Or they may be neutral, negatively charged or positively charged molecules as part of overall negatively charged assemblies such as complexes and micelles, as it may be found for micelles of a surfactant or of another molecule. The molecules A comprise preferably water molecules, organic molecules like biomolecules, MBT, proteins and quinaldates and/or inorganic molecules like phosphates and vanadates. For example, if there are $MBT^-$ anions intercalated in LDH particles in the presence of water molecules, $MBT^-$ may react with water according to an acid-base-reaction so that neutral molecules of MBT will result and vice versa. Such changes cannot be easily proved in samples and can often occur. Therefore, MBT and other anions A resp. molecules A herein are generally not written as $MBT^-$ resp. as anions showing negative charge resp. as molecules showing negative or positive charge, but only as "MBT". Further on, to shorten the text, the assemblies A containing species like a molecule and ions are typically not further mentioned, although included in the term "molecules A".

Nearly every anion exchange occurs with integration of smaller or bigger anions and/or molecules A than have been before in the crystal structure of the LDH phase, so that there may occur a shrinking or swelling of the interlayer spacings. In the present invention, the term "anion exchange" includes the exchange of anions, molecules and assemblies in every possibility of exchanges so that it includes every type of species A.

Different cations can be used as $M^{2+}$, $M^{3+}$ and $M^{4+}$, as long as their ionic radii do not differ in a big extent from the radius of $Mg^{2+}$ of 0.65 Å, to facilitate their accommodation in the holes of closely packed OH groups in the hydroxide layers of the LDH phase crystal structure. These include preferably $Ca^{2+}$, $Co^{2+}$, $Fe^{2+}$, $Mg^{2+}$, $Mn^{2+}$, $Ni^{2+}$, $Zn^{2+}$, $Al^{3+}$, $Ce^{3+}$, $Co^{3+}$, $Cr^{3+}$, $Fe^{3+}$, $V^{3+}$, $Si^{4+}$, $Ti^{4+}$ and $Zr^{4+}$. The determination of the complete formula of LDH phases requires the utilization of complementary techniques such as Ion coupling plasma like ICP-OES or ICP-AES, energy dispersive analysis, elemental analysis, thermogravimetric techniques, chromatographic techniques, UV-visible spectroscopy, acid-base titration. Therefore, in the examples of the present application simplified general formulas are used. For example, $Zn(2)$-$Al(1)$-$NO_3$ means a LDH phase prepared using a Zn:Al atomic ratio of roughly 2:1 and nitrate as the intercalating anion. There can be limitations in the type of anions to be intercalated depending on the anions' properties and the parameters associated with specific methodologies of synthesis. Anions that generate considerable changes of pH outside of the range, in which the LDH phases are stable, should be handled with care. Further on, incoming anions that show a relative low selectivity compared with the intercalated anion or that show a too large anion size, which can lead to exfoliation and to the loss of anion exchange capacity, should be also handled with care. But the anions and cations mentioned above for the LDH particles, should all typically work well, if the selected anions, molecules and assemblies do not impair the selected coating corrosion composition or the selected conditions by which this coating composition is going to be applied.

The LDH phase on the base of hydrotalcite is a LDH phase in which carbonate is the intercalating anion in a formula of about $[Mg_6Al_2(OH)_{16}CO_3$ [guest anion/molecule]$.mH_2O]$. The parameter m is typically 4.

When hydrotalcite is calcined, there is a loss of water and carbonates and dehydroxilation of LDHs occurs, resulting in the formation of a mixture of oxides especially of Mg and Al and of a spinel like $MgAl_2O_4$. These are detected in the XRD pattern. When this mixture is immersed in water containing anions the LDH structure is reconstructed.

After rehydration of a calcined Mg—Al LDH sample, the extent of Mg—Al LDH phase reconstructed is several percent of the extent compared to the initial sample.

Of the different LDH phases, Mg—Al, Zn—Al, Ca—Al and Ni—Al based LDH phases seem to be the most relevant ones for applications as hosting structures, not only from an economic point of view, but also from the perspective of performance, especially because of the easiness of synthesis routes to obtain such compositions with high crystallinity and therefore desired functionality. Coprecipitation and optionally additionally anion-exchange or calcination resp. calcination-rehydration methodologies are commonly used to obtain LDH phases with this composition.

LDH phases combining divalent, trivalent and tetravalent cations or different divalent/trivalent cations may be on the base of LDH phases of—for example—Mg/Al/$Zr^{IV}$—$CO_3$, Mg/Al/$Sn^{IV}$—$CO_3$, $M^{II}$/Al/$Sn^{IV}$—$CO_3$ ($M^{II}$=Co, Ni), $M^{II}$/Al/$Sn^{IV}$—$CO_3$ ($M^{II}$=Mg, Ni, Zn), Mg/Al/$Ti^{IV}$—$CO_3$, Mg/Al/$Si^{IV}$—$CO_3$, Zn/$Ti^{IV}$—$CO_3$ containing no trivalent cations, Cu/Ni/Al—$CO_3$ and Cu/Ni/Mg/Al—$CO_3$. Such LDH phases belong to the LDH phases according to the invention too.

With view to the variability of LDH phase compositions, the most stable LDH phases for release and exchange of anions seem to be Zn—Al and Mg—Al, especially in a relation of $M^{2+}$:$M^{3+}$ of about 2:1 and of about 3:1. For other types of LDH phases, the crystallinity as measured with XRD is often not as high, which may result in a decrease of the anion loading capacity and in an uncontrolled release of anions.

The term "layered double hydroxide" or "LDH" is used herein primarily, but not only, for more or less ordered or disordered layered crystal structures, which show hydroxide layers if they are not intensively calcined, and which show often guest anions and/or guest molecules in the intercalating layers of the LDH crystal structure. Structurally the layers may contain positively charged mixed metal hydroxides. Between the layers which are charged with compensating anions and/or molecules, solvent molecules like such of water and/or organic solvent may exist. Besides of such typical LDH phases, their reaction products and derivatives of identical or similar crystal structures belong further on to the LDH phases in the sense of this invention. Finally, their partially or totally calcined and their partially or totally calcined and afterwards partially rehydrated phases belong to such group of LDH phases in the sense of this invention and are called herein LDH phases too, although they are at least partially dehydroxylated and of different crystal structure.

The LDH phases can be dispersed in aqueous and/or non-aqueous solvents or can be kept in a dry status, e.g. as powder, coated powder or functionalized powder.

In general, natural LDH material may be used directly for corrosion inhibiting applications, but such material typically does not show any corrosion inhibitor content, or natural LDH material may be used after adequate modification for corrosion inhibiting applications. Natural LDH material may be based e.g. on alumohydrocalcite, hydrocalumite, hydrotalcite and/or hydromagnesite. Natural LDH particles may perhaps vary stronger in some of their properties from time to time, especially in particle sizes, in degree of intercalation, in water content and in impurities, whereas synthetic LDH particles may in comparison thereto be manufactured with constant and superior properties.

Generally, there exist different preparation routes and modification routes for synthesis and/or optimization of LDH phases. The most relevant routes are:
1) Coprecipitation of mixtures of cation hydroxides in the presence of the corrosion inhibiting anions and/or molecules A to be intercalated—referred herein as "coprecipitation". 2) Modification of natural or synthetic LDH particles, which may be in the state of natural occurrence or which may be synthesized LDH particles. This may be performed e.g. by coprecipitation and/or by ion exchange reaction occurring between anions present in the LDH starting material and corrosion inhibiting anions and/or corrosion inhibiting molecules A which are dissolved in aqueous solutions—referred herein as "anion exchange". But if the LDH phase is a carbonate, there is typically only a very low extent of anion exchange possible, often of about 1%. 3) Calcination of natural or synthetic LDH particles, which may have been modified or which may have been synthetically prepared by coprecipitation. The calcination may be followed by rehydration using structural memory effect for reconstruction of the LDH phase—herein referred to as "calcination and rehydration". 4) Hydrothermal methods. 5) Secondary intercalation, which means that pre-intercalation by smaller guests using coprecipitation or anion-exchange methods is used as an effective way to enlarge the interlayer space when there are very large differences in size and/or charge densities between the initial intercalated anion and the anion to be ultimately intercalated. 6) Intercalation involving dissolution and re-coprecipitation processes, which is used for the preparation of carboxylate-intercalated LDHs using carbonate-containing LDHs as precursors and involves dissolution of the precursor by adding an aqueous solution of the appropriate carboxylic acid, followed by re-precipitation on mixing with a basic solution.

The preparation of LDH particles is dependent upon different parameters, which are related to the methodologies implemented. In the coprecipitation methodology, important parameters are the pH of reaction, conditions of thermal and hydrothermal treatment (time and temperature), level of reactants supersaturation, type of anions and or molecules A to be intercalated in the forming LDH phase, chemical composition of the LDH sheets to be formed and the stability of these sheets, separation of nucleation, crystal growth and aging steps. In the anion-exchange methodology, important parameters are the type of incoming anions and their affinity to the LDH phase, type of exchange medium, pH of reaction and chemical composition of the LDH sheets. In the calcination rehydration methodology, important parameters are calcination temperature, temperature ramps and chemical composition of the LDH sheets. In hydrothermal methods, temperature is the most relevant parameter.

It is preferred to remove non-corrosion-inhibiting anions like carbonate or nitrate from the starting LDH phase and to include other corrosion inhibiting anions and/or molecules A during a chemical reaction between a soluble corrosion inhibitor and LDH particles dispersed in an aqueous medium in a so-called step of "anion exchange". For the use of a LDH phase for excellent crystalline and/or corrosion resistant LDH phase, an anion exchange is often necessary. Preferably, there has been performed an anion exchange during the preparation of the LDH phase and/or during a treatment of the starting LDH phase before application of the desired LDH phase for a coating process. Another possibility is the incorporation of the corrosion inhibiting anions and/or molecules A by calcination followed by rehydration of LDH starting materials. Within the understanding of the present application, the term "anion exchange" comprises an exchange of anions and/or molecules.

Anion exchange is primarily the effect of exchanging a specific anion at least partially with another kind of anion. Anion exchange is typically controlled by equilibrium. It depends on pH, surface charge of the anion, selectivity of the anion, crystal structure spacing and possibility of hydrogen bridge-bonding of the anion to the LDH phase. For the use of corrosion resistant coatings, it is preferred to exchange anions and/or water by corrosion inhibiting anions and/or molecules A as mentioned above. There may be used at least one type or at least two types of corrosion inhibiting anions and/or molecules A in the LDH phase.

Preferably, the anions and/or molecules A contained in LDH particles after an anion exchange, after a rehydration of at least partially calcined LDH particles or on the surfaces of the LDH particles are selected from the group consisting of complex fluorides, chromate, chromite, molybdates, phosphomolybdates, phosphates, phosphonates, tungstates, vanadates, azoles like benzothiazoles, 2-thiazoline, benzotriazoles and benzimidazoles, carboxylates like benzoates, fumarate, lactate, octanoate, oxalate, phthalate, salicylates and succinates as well as dodecylbenzenes and phenolic compounds.

Preferably, the releasable species A are released from the LDH particles into the coating composition or into the surrounding of the LDH particles in the thereof generated coating. This effect seems to be often the most important effect of LDH particles used in the present invention for non-calcined LDH particles. More preferred, the releasable species A are corrosion inhibiting and optionally even improving adhesion.

Preferably, water and/or corrosive anions like chloride and/or sulfate are incorporated into the LDH particles during an up-take from the surrounding of the LDH particles. These effects may especially be in such way that water and/or corrosive anions can no longer cause harm or can cause less harm to the metallic surface covered.

Additional to any kind of LDH particles added to a coating composition and then contained in the thereof generated coating, there may be added at least one type or at least two types of corrosion inhibitors as corrosion inhibiting anions and/or substances B in the coating composition. For such coating compositions or the thereof generated coating, the LDH particles themselves in the coating composition or coating may show or may not show any corrosion inhibiting anions and/or molecules A. The corrosion inhibiting anions and/or substances B may be the same that may perhaps be contained and perhaps even be released from the LDH particles in this coating composition or coating. In other embodiments, the corrosion inhibiting anions and/or substances B are not the same that are contained and perhaps even be released from the LDH particles in the coating composition or coating. But in still further embodiments, the LDH particles in a coating composition or coating do not contain any corrosion inhibiting anions and/or molecules A, so that there are only corrosion inhibiting anions and/or substances are only contained in the coating composition or coating from the addition of at least one or at least two corrosion inhibitors as corrosion inhibiting anions and/or substances B and not from the LDH particles.

More preferred is a) an anion exchange with corrosion inhibiting anions and/or molecules A, b) the use of an LDH phase containing corrosion inhibiting anions and/or molecules A and/or c) the use of corrosion inhibiting anions and/or molecules A in a coating composition or coating that are not only or not contained in the LDH particles or that are not only or not released from the LDH particles, but added separately to the coating composition and therefore even contained in the thereof generated coating as corrosion inhibiting anions and/or substances B.

The corrosion inhibiting anions and/or substances B are preferably selected from the group consisting of complex fluorides, chromates, chromites, molybdates, phosphomolybdates, phosphates, phosphonates, tungstates, vanadates, azoles, carboxylates like benzoates, fumarates, lactates, octanoates, oxalates, phthalates, salicylates and succinates as well as dodecylbenzenes, phenolic compounds and their derivatives. These terms include the anions and substances in the broadest sense, this means e.g. for phosphates even $M^{1+}{}_2HPO_4$, $M^{2+}HPO_4$, $M^{1+}H_2PO_4$, $M^{2+}(H_2PO_4)_2$, diphosphates, polyphosphates and organically modified phosphates like alkylphosphates.

Most preferred are corrosion inhibitors B selected from the group consisting of anions and substances on the base of phosphates, molybdates, tungstates, vanadates, mercaptobenzothiazolates like MBT and quinaldates.

When adding these anions respectively compounds, preferably salts of ammonium, sodium, potassium and lithium as well as organically modified compounds could be used.

Anion-exchange reaction can be used to intercalate or to take up the corrosion inhibiting anions and/or corrosion inhibiting molecules A during the preparation stage and also to release the corrosion inhibiting anions and/or molecules A preferably in a controlled and active manner, which may be triggered e.g. by the presence of corrosive anions, by pH change and/or by mechanical stress.

But starting anion exchange from carbonate containing LDH precursors, such anion exchange may often be less effective due to the strong interaction of carbonate anions with the LDH interlayer sheets then e.g. starting from nitrate containing LDH precursors.

Trigger of the release of corrosion inhibitors out of the LDH phase by anion exchange is often the presence of corrosive anions such as halides like chloride, carbonates and sulfates. It was found that the release e.g. of nitrate or molybdate anions from the LDH particles into the surrounding is triggered by the presence of chloride. The kinetics of release often act in a minute timescale, so that LDH particles may be partially filled with the new intercalating anions in approximately 30 minutes in aqueous solutions for an anion exchange, after which a chemical equilibrium is achieved. Trigger of the release of a corrosion inhibitor may be a change of the pH of the surrounding solution, dispersion and/or atmosphere like humidity. But a quite low pH may often result in a slight or even strong dissolution of the LDH particles in the surrounding solution resp. dispersion.

The LDH phase may generally be stable in a pH range of about 3 to about 12, primarily depending on the specific anions, cations and molecules present. In the case of an aqueous system, the pH is preferably kept in an intermediate pH range between dissolution of often stronger acidic systems and precipitation of often stronger alkaline systems. The pH interval between dissolution and irreversible structural change that leads the crystal structure of LDH phase into amorphous material is typically in a range of from 3.5 to 12, of from 5 to 11, of from 6 to 9 or in a smaller pH range within the broadest of these ranges. This is a pH interval in which the corrosion inhibiting anions and the corrosion inhibiting molecules work: Such corrosion inhibitors are of a type of anions A and/or molecules A. For a specific LDH phase, this range depends on the type of specific anions, cations and molecules present. At higher pH, the crystalline LDH phase may be destroyed into amorphous phases or may dissolve.

The LDH phase may be slowly dissolving, especially at a pH lower than 3, lower than 4 or lower than 5, often subsequent to the release of anions. A high pH may provide OH$^-$ into the surrounding solution resp. dispersion that can be exchanged to some extent with the intercalating corrosion inhibiting anion in the LDH phase.

Generally, a slight solubility of the LDH phase in water has been observed under specific conditions like in aqueous environment of low pH, so that even cations may be released into the surroundings by this dissolution. But it has not been observed that there occurs a cation exchange. Some cations may be intercalated too in a small amount in a synthesis step and/or may be released separately or at the same time of anion exchange. In the case that cations are released from the positively charged layers in the LDH structure, it may occur that a lack of charge is then compensated by structural modifications in LDH phases and/or by release of anions.

The high crystallinity of LDH phases often corresponds to a high loading degree with corrosion inhibiting anions or molecules A and corresponds often further with controlled release of such anions. As the LDH phase is used as a host matrix, it is assumed that all the LDH phases that do not generate well-defined crystalline LDH particles resp. LDH phases may have limited application for corrosion resistance, as the LDH particles shall work as nanocontainers to carry the corrosion inhibitor, in the case that they were not calcined.

LDH particles whose XRD pattern show intercalated corrosion inhibiting anions and/or molecules A in the LDH interlayer spacing seem to provide better control over the release of corrosion inhibiting anions and/or molecules A in comparison to LDH particles whose XRD patterns do not show intercalation of the corrosion inhibiting anions and/or molecules A. In the latter case, this may perhaps indicate that only or primarily a non-controlled release of corrosion inhibiting anions and/or molecules A may occur from the outer surface and porous parts of the LDH particles, which may be controlled e.g. by diffusion. A change of pH and/or presence of other anions and/or molecules A may lead to a release of intercalated anions and/or molecules A. If the anions and/or molecules outside the LDH material would make the chemical LDH system more stable or if it is a question of equilibrium and relative concentration of the available anions and/or molecules, then these anions and/or molecules A seem to try to intercalate into the LDH structure by displacement of the anions and/or molecules A actually present.

Its crystallinity may be determined with X-ray diffraction XRD. A high crystallinity is seen by sharp and strong XRD peaks. A high crystallinity of a LDH phase has been found for particles of low mean crystallite size.

Preferably the LDH particles show plate-like morphology. Preferably individual non-agglomerated and non-aggregated LDH particles have a mean diameter of the plates in their longest direction in the range of from 20 to 1000 nm, of from 40 to 500 nm or of from 60 to 400 nm when seen in scanning electron microscope SEM images. Preferably such LDH particles have a height perpendicular to the plate in the range of from 2 to 200 nm, of from 10 to 120 nm or of from 20 to 60 nm when determined by estimation with atomic force microscopy AFM or with transmission electron microscopy TEM technology.

By calcination without rehydration, a hydrotalcite-like compound is generated which is a material that contains all the essential crystal structural elements making up a typical LDH phase, but lacks the structural functionality found in true LDH phase. Such calcinated material is often called "hydrotalcite-like material" or "LDH-like material". Within the understanding of the present invention, the terms "LDH . . . " shall include such "LDH-like . . . " terms.

Preferably, the LDH particles are at least partially calcined to generate at least partially dehydroxylated particles. Such particles may sometimes show aggregates and/or agglomerates similar to cauliflowers or to calcined aluminium hydroxide crystals. They often show a more or less continuous porosity within often well crystallized small plates which are often standing in a structure similar to a house of cards. Such particles may often have a very high specific surface. These particles are effective to take up a liquid like an aqueous solution with their anions and molecules. But these calcined particles seem to have additionally a memory effect as they seem to be able to reconstruct their original typical LDH structure to a certain extent, if they get in contact with water again. The calcined LDH phase is very reactive and hygroscopic, so that the re-nucleation of the LDH phase seems to be well possible. Therefore, it is preferred that the coating composition or the thereof generated coating contains calcined LDH particles.

Preferably, the calcined particles are rehydrated, wherein the crystal structure of the original LDH phase is partially reconstructed to LDH phase and wherein such LDH particles are loaded with corrosion inhibiting anions and/or molecules A.

Preferably, the coating composition or the thereof generated coating contains LDH particles, which have been subjected to an anion exchange during preparation of LDH particles, during rehydration of at least partially calcined LDH particles, during release and anion up-take especially during running corrosion like chloride up-take of LDH particles or during water up-take of LDH particles especially for dry or solvent-based systems.

If a LDH material has strongly held intercalating anions in its composition, anion-exchange methodology may often not be the suitable route to intercalate corrosion inhibiting anions and/or molecules A in LDH interlayer spacing, if the intercalating anions and molecules present are not easily displaceable from the interlayer spaces. Then the route of calcination of the LDH starting material is preferred to remove volatile anions such as carbonates. The LDH phase, which is a LDH phase starting material, which may be used for calcination or for calcination and rehydration, is preferably one that can easily provide a crystal structure to incorporate the desired anions which are mentioned herein to be corrosion inhibitors. Therefore, LDH phases containing carbonates and nitrates seem to be the most preferred starting materials.

By the route of calcination and rehydration, production of LDH particles may be sometimes quicker and easier performed than by fresh preparation via the route of coprecipitation and anion exchange, especially for laboratory manufacture. Concerning the loading degree with corrosion inhibiting anions and molecules A, it is still left open, which of these routes is better, as it depends on the individual chemistry selected for working, if the loading degree, the releasing degree as well as the uptake degree for corrosive anions is in different quality levels for the route of calcination and rehydration in comparison to the route of coprecipitation and anion exchange. There may be some chemical systems, especially when calcining a carbonate based LDH phase, in which the loading degree may be slightly reduced for the route of calcination and rehydration in comparison to the route of coprecipitation and anion exchange.

The degree of calcination may be a function of the maximum calcination temperature, of the heating rate and to a certain degree even of the time of calcination. Especially in the temperature range of 200 to 300° C., dehydroxylation occurs. After some time at a temperature especially above 200° C. or above 300° C., the LDH phase loses considerable amounts of volatile intercalating anions like carbonate, nitrate and hydroxide. The dehydroxylation leads to the formation of oxides of the cations still present in the dehydroxylated LDH phase. The degree of calcination may lead to a chemical calcination reaction in a range between 1 and 100%, but cannot be exactly measured.

The calcination process is preferably performed in a controlled manner. It is preferably performed up to a maximum temperature in a range of from 500 to 900° C. for total calcination or up to a maximum temperature in a range of from about 250 to about 500° C. for partial calcination. TG-DTA curves show temperatures at which the anions are released and/or decomposed. It was observed that nitrate was partially or totally released during calcination, especially in a LDH phase on the base of Zn—Al—$NO_3$, depending primarily on calcination temperature. The decomposition of $CO_3$ and $NO_3$ in LDH phases often occurs at a temperature range of from 250 to 450° C. These anions are released as gas like $CO_2$ and/or $NO_x$. LDH phases showing a carbonate and/or nitrate content may be calcined and may be afterwards rehydrated. During rehydration, the LDH phase may be partially reconstructed, wherein only a partial degree of the original crystallinity degree of the original LDH phase before the calcination may be reached.

The rehydration is based on a "memory effect" according to which the LDH crystal structure, after having been destroyed by high temperatures, is recovering in the presence of water and anions. The LDH structure can even be reconstructed in air at much slower rate from humidity and carbon dioxide and extent than during preparation in aqueous solution. The rehydration of a dehydroxylated LDH phase that has been partially or totally destroyed by calcination often leads to a partially reconstructed LDH phase. But non-volatile components such as vanadates are usually retained in a calcined LDH material like other inorganic components too. From some LDH precursors, a new non-LDH substance may be generated during the calcination. If this substance is generated in a considerable amount of a high-temperature stable compound like certain vanadates, there is no chance for a partial reconstruction of the LDH phase.

The rehydration degree gained by the rehydration can be estimated from TG-DTA investigations. The water content of a LDH material as powder sample after calcination and rehydration may often be in a range of 1 to 50% by weight by water uptake or in a range of 3 to 35 or of 5 to 20% by weight %. The possibility of rehydration and the rehydration degree are partially dependent on the intercalating anions present and on the process conditions of the rehydration. The highest degree of reconstructed LDH phase can be reached with a low calcination temperature, a high immersion time during rehydration and adequate anions present. By rehydration, the mixture for example of magnesium oxides, aluminium oxides and spinel generates Mg—Al—X LDH phases, wherein X are intercalating anions like $OH^-$, corrosion inhibiting anions and/or molecules A. The anion loading content can often not be differentiated during the TG-DTA measurement, if it coincides with the dehydroxilation of the LDH phase.

For calcined and subsequently rehydrated LDH particles, the corrosion inhibiting anions and molecules A (the "corrosion inhibitor") can be sometimes more located on outer surfaces than in inner parts of such LDH particles, which may mean then in the interlayers of calcined and rehydrated particles and/or which may mean then less in their pores.

The quality of calcined LDH materials depends primarily from temperature and rate of heating, but the lower the rate of heating to gain a selected temperature, the better are the partially or totally calcined particles in view of improving the crystallinity of the rehydrated product. Probably even the degree of crystallinity improves. Then it is supposed that the degree of anion uptake during rehydration is improved too, so that there may be a higher loading degree with corrosion inhibiting anions and molecules A achieved than for less crystalline LDH material.

The calcined LDH particles may be called nanotraps. They may work as water-nanotraps by incorporation of water molecules into the calcined LDH and/or dehydroxylated LDH material and/or as anion-nanotraps by incorporation of corrosion inhibiting anions and/or molecules A available in the surroundings. This may occur according to the topotactic reaction intrinsic to rehydration. It has now been found that calcined and rehydrated LDH particles work often excellent in any kind of composition of the present invention. And it has now been found that calcined LDH particles work often excellent in a composition of a water-free primer, but if there is used an aqueous primer, the water-nanotrap effect may sometimes be limited because of the topotactic reaction occurring with rehydration within the formulation and even only an anion-nanotrap effect may perhaps be verified in the already reconstructed LDH phase or phases, so that only anions may be taken up. It is expected that all varieties of LDH particles having any anions/molecules/assemblies intercalated in the LDH structure or not as in the case of calcined LDH phase, are able to entrap chloride anions—by an anion exchange mechanism and/or by reconstruction of at least partially calcined LDH phase. This entrapment may occur for anion loaded LDH particles, when a portion of these anions is leaving the intercalating layers and/or the sites on the LDH particles' surfaces. If only a minor portion or a certain portion of the chloride is taken up by such anion-nanotrap effect, this will cause a significant improvement in corrosion resistance.

Further on, if there occurs a degradation of a coating such as under practical use, corrosion processes may initiate and cause changes in the pH of water residues in contact with the metallic surfaces, most often occurring in places where the coating degradation is stronger, there is the possibility that the pH of the water residues is changed to less acidic conditions in the presence of calcined LDH particles. These effects too may perhaps improve the corrosion inhibition.

Therefore, the LDH particles of the present invention which may be calcined, calcined and rehydrated or not, may be used as nanocontainers if they contain at least one releasable species A which is able to be released from the LDH particles, as nanocontainers for corrosion inhibiting anions adsorbed on the surfaces of LDH particles, as nanocontainers for releasable corrosion inhibitors B and/or as nanotraps which are able to entrap water and/or anions like chloride from the surrounding of the LDH particles.

In the case that exfoliation of LDH particles should occur, e.g. under immersion of non-aqueous solvents after replacement of interlayer inorganic anions with organophilic anions resp. molecules such as fatty acid salts or anionic surfactants to make interlayer interactions weaker, the exfoliated LDH particles are often less excellent for corrosion resistance, as exfoliation leads irreversibly to another crystal structure and to a much lower loading with corrosion inhibiting anions and molecules.

Properties of the LDH Particles:

LDH particles are called "nano-" like in nanoparticles, as such LDH particles are often plate-like and as the plate-like particles have preferably a height perpendicular to the plane of the plate often in a range of from 2 to 200 nm, of from 10 to 120 nm or of from 20 to 60 nm, when determined by estimation with atomic force microscopy AFM or with transmission electron microscopy TEM technology. The LDH particles may therefore be seen as nanocontainers, which may include corrosion inhibiting anions and/or molecules A for release in their structure and/or which may take up water, corrosive anions and/or molecules by entrapment (nanotraps).

Preferably, the LDH particles are predominantly plate-like. Preferably, the LDH particles are predominantly well crystallized. Preferably, the LDH particles show a zeta potential in a range of up to −30 mV or of at least +30 mV as measured in deionized water at room temperature. Their zeta potential is correlated to pH in a range of from 4 to 12 or of from 5 to 11 or to a similar, but more limited range.

Selected LDH phases allow the improvement of corrosion inhibition and other properties by different effects. Of these effects, not all of these do occur for every type of LDH phase and for every condition:

1. Barrier effect of the particles, which are often plate-like and which cover the surface of the metallic surface by plane contact (passive corrosion protection).
2. Influence on corrosion rate by the LDH phase containing corrosion inhibiting anions, which may be released from the interlayers of the LDH crystal structure, which may be leached out from the inner parts of the particles and/or which may be located on the outer surfaces of the LDH particles (active corrosion protection by release from nanocontainer).
3. Influence on corrosion rate by the LDH phase containing corrosion inhibiting anions by uptake of corrosive anions like chloride out of a solution in contact with a metallic surface or with a coated metallic surface or in contact with the surrounding atmosphere (active corrosion protection by entrapment).
4. Influence on corrosion rate by preferably calcined LDH particles that may take up water and perhaps additionally corrosive anions that may be trapped in the particles (active corrosion protection by entrapment). The water-take-up ability is strongly enhanced by hygroscopy of the calcined LDH particles.
5. Influence on adhesion and/or mechanical properties by LDH particles' plates of the plate-like crystalline LDH particles that can improve these properties.

In a first preferred embodiment, the LDH phase may be optimized or selected according to crystallinity and/or XRD crystallite sizes, but nevertheless, this does not guarantee a higher loading degree with anions and molecules A and subsequently a higher performance quality in coating of metallic surfaces. A high crystallinity may be gained by the selection of proper synthesis methodology, and within this by careful control of specific experimental conditions like concentration of reactants, pH, conditions of hydrothermal treatment and mixing rate. The composition of LDH hydroxide layers in terms of metal cations used and also the intercalating anions will also affect the long-order range of LDH phases.

In a second preferred embodiment, the LDH phase may be optimized or selected according to the selection of the type of corrosion resistant anions and/or molecules A, which may probably improve the corrosion resistance of the coatings on the metallic surfaces. A high corrosion resistance may be gained by proper selection of the corrosion inhibiting anions and/or molecules A for a specific metallic substrate and for the specific conditions under which it will operate, and/or by the combination of different corrosion inhibiting anions and/or molecules A e.g. with corrosion inhibiting anions especially selected from the group consisting of MBT, molybdates, phosphomolybdates and vanadates. To the most preferred combinations belong vanadate plus at least one component selected from the group consisting of MBT, silane/silanol/siloxane, silicate anions and water glass.

In a third preferred embodiment, the LDH phase may be optimized or selected according to the selection of the type of corrosion resistant anions and/or molecules A, which may probably improve the corrosion resistance of the coatings on the metallic surfaces. A high paint adhesion may be gained by adding the LDH particles. A high adhesion of the present coating on the metallic surface may be gained by adding the LDH particles.

In a fourth preferred embodiment, the LDH phase may be optimized or selected according to the improvement of the colloidal stability of the LDH particles, but nevertheless, this too does not guarantee a higher loading degree with anions and molecules A and subsequently a higher performance quality in coating of metallic surfaces. One possibility to gain a high colloidal stability of the LDH particles may be gained by stabilization of the LDH particles by utilization of surface active species such as surfactants or polyelectrolytes or by chemical functionalization of the surface.

In a fifth preferred embodiment, the LDH phase may be optimized or selected in such way to reduce the spontaneous leaching of corrosion inhibiting anions and molecules A into the surrounding coating composition or solution in order to avoid or limit detrimental interactions between corrosion inhibitor and the coating matrix, which could otherwise lead to the degradation of the generated coating, and also to limit the leaching of possibly toxic corrosion inhibitors into the environment. A low leaching rate of corrosion inhibiting anions and molecules A into the surrounding coating composition or solution of the LDH particles may be gained by efficient washing of the LDH particles to decrease the amount of inhibitor adsorbed on the outer surfaces of the LDH particles without impairing the loading content of corrosion inhibiting anions and/or molecules A within the interlayer spacings.

According to the present invention, an aqueous pretreatment composition or the thereof generated coating or an aqueous passivation composition or the thereof generated coating or an aqueous pretreatmentprimer composition or the thereof generated coating or a non-aqueous pretreatmentprimer composition containing organic solvent and/or reactive thinner or the thereof generated coating or an aqueous primer composition or the thereof generated coating or a non-aqueous primer composition containing organic solvent and/or reactive thinner or the thereof generated coating or an aqueous paint composition or the thereof generated coating or a non-aqueous paint composition containing organic solvent and/or reactive thinner or the thereof generated coating or an aqueous electrocoating composition or the thereof generated coating preferably contains at least one LDH phase containing corrosion inhibiting anions/molecules, at least one partially calcined LDH phase containing corrosion inhibiting anions/molecules and/or at least one partially or totally calcined and rehydrated LDH phase containing corrosion inhibiting anions/molecules.

Preferably, the coating composition or the thereof generated coating contains at least one particulate LDH phase and at least one constituent each selected from the group consisting of silane/silanol/siloxane, water glass, titanium compound, zirconium compound, and organic polymer/copolymer or contains at least one particulate LDH phase and at least one constituent each selected from the group consisting of silane/silanol/siloxane, water glass, titanium compound and zirconium compound.

Preferably, the passivation composition, the pretreatment composition, the pretreatmentprimer composition, the primer composition, the paint composition, the electrocoating composition or the thereof generated coating contains besides of at least one particulate LDH phase at least one silane/silanol/siloxane, a water glass, a titanium compound, a zirconium compound and/or at least one organic polymer/copolymer.

Preferably, there is added at least one of the following compounds to an aqueous coating composition:

At least one compound selected from the group consisting of heterocyclic compounds, carboxylic acid amides and/or acetylacetonates, citrates and/or lactates, especially added in a quantity of 0.01 to 3% by weight.

More preferred, there is added at least one of the following compounds to an aqueous coating composition:

At least one heterocyclic compound selected from the group consisting of mercaptobenzothiazoles, benzotriazoles, imidazoles, benzimidazoles, hydroxyquinolines and 2-mercaptobenzimidazoles;
at least one carboxylic acid amide selected from the group consisting of ureas, thioureas, dimethylureas, diethylureas, dibutylureas, allylthioureas and methylthioureas; and/or
at least one acetylacetonate, citrate and/or lactate selected from the group consisting of the acetylacetonates of the metals manganese, vanadium, titanium and zirconium.

Preferably, the water glass is a water glass on the base of sodium, potassium and/or lithium. Preferably, the coating composition or the thereof generated coating contains at least one type of water glass in a total range of from 0.1 to 5 or of from 0.5 to 3% by weight. If the coating composition or the thereof generated coating contains a water glass, then it is often preferred that it contains additionally at least one heterocyclic compound, at least one carboxylic acid amide, at least one chelate, at least one titanium or zirconium compound and/or at least one pH adjusting compound.

Preferably, the at least one silane/silanol/siloxane added is a mono-silyl-compound and/or a bis-silyl compound. In some embodiments, it is especially preferred to add then a bis-silyl compound selected from the group consisting of bis(trialkoxysilylalkyl)amine and their derivatives. Preferably, the silane/silanol/siloxane is based on at least one Si compound containing at least one amino, at least one imino and/or at least one ureido group per molecule. The silane/silanol/siloxane added may preferably contain one amino group or at least two amino groups per molecule.

Preferably, the coating composition contains at least one or at least two silanes/silanols/siloxanes in a total range of silanes/silanols/siloxanes of from 0.01 to 10, of from 0.05 to 7, of from 0.1 to 5, of from 1 to 5, of from 0.02 to 1.5, of from 0.8 to 3 or of from 1.2 to 2% by weight. Preferably, the thereof generated coating contains at least one or at least two silanes/silanols/siloxanes in a total range of silanes/silanols/siloxanes of from 0.1 to 80, of from 0.5 to 60, of from 5 to 60, of from 1 to 30, of from 0.5 to 15 or of from 2 to 8% by weight.

Preferably, the silane/silanol/siloxane is selected from the group consisting of aminoalkylaminoalkylalkyldialkoxysilane, bis(trialkoxysilylalkyl)amine, alkylaminoalkylaminotrialkoxy silane, gamma-aminoalkyltrialkoxysilane, gamma-ureidoalkyltrialkoxysilane, N-beta-(aminoalkyl)-gamma-aminoalkyl-trialkoxysilane, N-(gamma-trialkoxysilylalkyl)dialkylenetriamine, poly(amino-alkyl)alkyldialkoxysilane and their derivatives.

More preferred, the silane/silanol/siloxane is selected from the group consisting of aminoethylaminopropylethyldiethoxysilane, aminoethyl-aminopropylmethyldiethoxysilane, aminoethylaminopropylethyldimethoxy-silane, aminoethylaminopropylmethyldimethoxysilane, bis(triethoxysilylpropyl)amine, bis(trimethoxysilylpropyl)amine, ethylaminopropyl-aminotriethoxy silane, ethylaminopropylaminotrimethoxy silane, gamma-aminopropyltriethoxysilane, gamma-aminopropyltrimethoxysilane, gamma-ureidopropyltriethoxysilane, gamma-ureidopropyltrimethoxysilane, N-(gamma-triethoxysilylpropyl)diethylenetriamine, N-(gamma-trimethoxy-silylpropyl)diethylenetriamine, N-beta-(aminoethyl)-gamma-aminopropyltriethoxysilane, N-beta-(aminoethyl)-gamma-aminopropyltrimethoxysilane, poly(aminoethyl)ethyldiethoxysilane, poly(aminoethyl)ethyldimethoxysilane, poly(aminoethyl)methyldiethoxysilane poly(aminoethyl)methyldimethoxysilane and their derivatives.

In some embodiments it is preferred that the at least one titanium compound and/or zirconium compound is a compound for pickling the metallic surface, is a compound for generating an oxidic coating directly on the metallic surface, is a chelate, is a complexing agent and/or is a crosslinking agent for organic polymer/copolymer. Preferably, the titanium compound and/or the zirconium compound are selected from the group consisting of acetylacetonates, carbonates, citrates, complex fluorides and lactates. Preferably, an individual compound of this group is added to a coating composition in an amount in a range of from 0.005 to 5 or of from 0.1 to 2% by weight. Preferably, an individual compound of this group is contained in the thereof generated coating in an amount in a range of from 0.1 to 1 or of from 1 to 8% by weight.

Preferably, the coating composition or the thereof generated coating contains (additionally) at least one organic polymer/copolymer and optionally at least one additive like a dispersing agent. Preferably, the pretreatment composition, the passivation composition or the thereof generated coating contain at least one organic polymer/copolymer, e.g. of at least one acrylic resin, of at least one epoxy resin and/or of at least one polyurethane resin, in a total content in the range of from 0.1 to 40 or of from 4 to 25% by weight or even no organic polymer/copolymer. Preferably, the pretreatmentprimer composition, the primer composition, the paint composition, the electrocoating composition or any of the thereof generated coatings contains at least one organic polymer/copolymer in a total content in the range of from 3 to 90, of from 20 to 70, of from 25 to 55 or of from 30 to 40% by weight, e.g. of at least one acrylic resin, of at least one epoxy resin, of at least one polycarbonate resin, of at least one polyurethane resin, of at least one ionomer, of at least one polyether and/or of at least one polyester.

Typically, there is no restriction of the type of organic polymer/copolymer added.

The primer and/or the paint composition according to the present invention may contain in addition to at least one organic polymeric substance a) mostly non-particulate additives as typically and/or often used agents for primer, paint and electrocoating compositions, b) non-particulate special additives that do not belong to a) which may be specifically used in some embodiments to optimize the compositions like a defoamer, a levelling agent, a adhesion promoter, a air release agent, a rheology agent, a anti-fouling agent, c) particulate materials e.g. on the base of any oxide like silicon oxide, silicate and/or titanium oxide, any phosphate, any chromate, which may grant properties like corrosion resistance or certain optical effects like a matting effect, any crosslinker like on the base of an isocyanate, a polyamine adduct, a zirconium compound and/or a silane and/or at least one solvent like on the base of an alcohol, an acetate, an ether, an etherester and/or an ester. The organic polymeric substance may be oligomeric, polymeric, copolymeric and/or blockcopolymeric.

All these coating compositions containing at least one organic polymer/copolymer or the thereof generated coatings may vary broadly in their chemical compositions. They may additionally contain at least one compound each selected from the group consisting of crosslinkers like isocyanates, isocyanurates and melamine compounds, photoinitiators, silanes/silanols/siloxanes, polysiloxanes, titanium compounds, zirconium compounds, water glass, corrosion inhibitors, dyes, pigments like corrosion inhibiting particles or nanoparticles, colouring pigments, matting agents, whitening pigments, electroconductive pigments, surface modifying agents, agents for modifying the structural viscosity and/or thixotropy of the coating composition, pH adjusting compounds and additives like biocides, defoamers, dispersing agents, flow-control agents, levelling agents, stabilizing agents and wetting agents. The composition and the constituents added to the composition are generally well-known.

For a pretreatment composition or passivation composition, it may be preferred that it contains a fluoride, an oxide, a phosphorous compound, a titanium and/or a zirconium compound, a compound of at least one of aluminium, chromium, cobalt, iron, manganese, nickel and zinc, an alkali metal compound, a silane/silanol/siloxanes, a silicate, an organic polymer/copolymer, a corrosion inhibitor, a complexing agent, a pH adjusting compound and/or any type of additive. Such composition may be either of an alkaline or of an acidic type, wherein pH of about 7 may be included in the pH range of at least one of these. Sometimes, care has to be taken that the corrosion inhibitor used does not deteriorate the paint adhesion.

For a pretreatmentprimer, for a primer composition, for a paint composition and for a electrocoating composition, it may be preferred that the dispersion is well stabilized e.g. with an addition of at least one surface modifying agent. In alternative thereto, it may be in singular embodiments preferred to allow the LDH particles settle down easily and to a high percentage on the metallic surface or on the already coated metallic surface, preferably as a gradient in the pretreatmentprimer respectively primer coating, so that at least 50% of all LDH particles are on the metallic surface or on the already coated metallic surface. Then there may perhaps be generated a gradient of LDH particles' content near to the metallic surface. In some embodiments, at least 80% of all LDH particles are in direct contact or in a distance of up to 1 µm to the metallic surface or to the coated metallic surface. Sometimes, care has to be taken that the corrosion inhibitor used in a pretreatment composition, pretreatmentprimer composition, primer composition, paint composition or electrocoating composition does not influence the quality of such liquid composition, of the thereof generated coatings or even that the corrosion inhibitor used does not destroy the primer, paint or electrocoating or especially the organic network used therein.

If there is a too high concentration of certain corrosion inhibiting anions like such of MBT, the coating composition or the thereof generated coating may be impaired by a low paint adhesion.

In some processes it is preferred to add the LDH particles not in the last step of a process succession or before a milling step, especially for any primer, as often better results are obtained, when LDH agglomerates are split during a milling step like with a pearl mill. A pearl mill causes very high shear and may help to mill the particles fine and to stabilize these so that no agglomerates can occur. Otherwise such agglomerates may impair the properties of the primer or paint composition and may significantly impair the corrosion resistance of the thereof generated coatings.

For calcined LDH particles it has been found that ageing and storing may perhaps influence the properties of these particles.

Preferably, the invention is directed to a process of coating a metallic surface with a composition for coating with a pretreatment composition prior to organic coating, with a passivation composition without intent for subsequent organic coating, with a pretreatmentprimer composition or with an electrocoating composition or to a process of coating a metallic surface with a composition for coating with a pretreatment composition prior to organic coating or with a passivation composition without intent for subsequent organic coating, wherein each one coating composition or the thereof generated coating contains particles on the base of at least one layered double hydroxide (LDH) phase showing the general formula [1], $$[M^{2+}_{(1\pm 0.5)-x}(M^{3+},M^{4+})_x(OH)_{2\pm 0.75}]A^{n-}{}_{x/n}\cdot mH_2O \qquad [1],$$

wherein $M^{2+}$, $M^{3+}$ and $M^{4+}$ are divalent, trivalent resp. tetravalent cations selected from the group consisting of $Ca^{2+}$, $Co^{2+}$, $Cu^{2+}$, $Fe^{2+}$, $Mg^{2+}$, $Mn^{2+}$, $Ni^{2+}$, $Zn^{2+}$, $Al^{3+}$, $Ce^{3+}$, $Co^{3+}$, $Cr^{3+}$, $Fe^{3+}$, $Ga^{3+}$, $V^{3+}$, $Si^{4+}$, $Sn^{4+}$, $Ti^{4+}$ and $Zr^{4+}$, wherein there is no need that cations $M^{3+}$ are present or there is no need that cations $M^{4+}$ are present, wherein x is the ratio of trivalent to the sum of divalent and trivalent metal cations $(M^{3+}+M^{4+})/(M^{2+}+M^{3+}+M^{4+})$ which is in the range of from 0.1 to 0.5 or from 0.2 to 0.33, wherein $A^{n-}$ indicates the overall negative charge of intercalated species A with n being in the range of from 0.1 to 100, wherein these anions A and/or molecules A are selected from the group consisting of anions of hydroxide, fluorides, carbonates, nitrates, sulfates, chromate, chromite, molybdates, phosphomolybdates, phosphates, phosphonates, tungstates, vanadates, azoles, carboxylates, dodecylbenzenes, phenolic compounds, anionic surfactants and biomolecules like proteins and quinaldics or wherein $A^{n-}$ indicates the overall negative charge of intercalated species A selected from the group consisting of anions A, molecules A and assemblies with molecules A with n being in the range of from 0.1 to 100 of from 1 to 20, wherein these anions A are selected from the group consisting of anions of hydroxide, fluorides, carbonates, nitrates, sulfates, chromate, chromite, molybdates, phosphomolybdates, phosphates, phosphonates, tungstates, vanadates, azoles, carboxylates, dodecylbenzenes, phenolic compounds and anionic surfactants, and/or wherein each one coating composition or the thereof generated coating contains their at least partially calcined and/or their partially or totally calcined and then rehydrated LDH particles which are primarily based on a mixture of substances selected from the group consisting of oxides, double oxides, multiple oxides, hydroxides, at least one LDH phase, anions A and molecules A.

Preferably, the invention is directed to a process of coating an iron or zinc rich metallic surface with a composition for coating with a pretreatment composition prior to organic coating, with a passivation composition without intent for subsequent organic coating, with a pretreatmentprimer composition, with a primer composition, with a paint composition or with an electrocoating composition, wherein each one coating composition or the thereof generated coating contains particles on the base of at least one layered double hydroxide (LDH) phase showing the general formula [1], $$[M^{2+}_{(1\pm 0.5)-x}(M^{3+},M^{4+})_x(OH)_{2\pm 0.75}]A^{n-}{}_{x/n}\cdot mH_2O \qquad [1],$$

wherein $M^{2+}$, $M^{3+}$ and $M^{4+}$ are divalent, trivalent resp. tetravalent cations selected from the group consisting of $Ca^{2+}$, $Cu^{2+}$, $Fe^{2+}$, $Mg^{2+}$, $Mn^{2+}$, $Zn^{2+}$, $Al^{3+}$, $Ce^{3+}$, $Cr^{3+}$, $Fe^{3+}$, $Ga^{3+}$, $V^{3+}$, $Si^{4+}$, $Sn^{4+}$, $Ti^{4+}$ and $Zr^{4+}$, wherein there is no need that cations $M^{3+}$ are present or there is no need that cations $M^{4+}$ are present, wherein x is the ratio of trivalent to the sum of divalent and trivalent metal cations $(M^{3+}+M^{4+})/(M^{2+}+M^{3+}+M^{4+})$ which is in the range of from 0.1 to 0.5 or from 0.2 to 0.33, wherein $A^{n-}$ indicates the overall negative charge of intercalated species A with n being in the range of from 0.1 to 100, wherein these anions A and/or molecules A are selected from the group consisting of anions of hydroxide, fluorides, carbonates, nitrates, sulfates, chromate, chromite, molybdates, phosphomolybdates, phosphates, phosphonates, tungstates, vanadates, carboxylates like benzoates, fumarate, lactate, octanoate and oxalate, dodecylbenzenes, phenolic compounds, anionic surfactants and biomolecules like proteins and quinaldics, and/or wherein each one coating composition or the thereof generated coating contains their at least partially calcined and/or their partially or totally calcined and then rehydrated LDH particles which are primarily based on a mixture of substances selected from the group consisting of oxides, double oxides, multiple oxides, hydroxides, at least one LDH phase, anions A and molecules A.

Further on preferred, the invention is directed to a process of coating a metallic surface with a composition for coating with a pretreatment composition prior to organic coating, with a passivation composition without intent for subsequent organic coating, with a pretreatmentprimer composition, with a primer composition, with a paint composition or with an electrocoating composition, wherein each one coating composition or the thereof generated coating contains particles on the base of at least one layered double hydroxide (LDH) phase showing the general formula [1], $$[M^{2+}_{(1\pm 0.5)-x}(M^{3+},M^{4+})_x(OH)_{2\pm 0.75}]A^{n-}{}_{x/n}\cdot mH_2O \qquad [1],$$

wherein $M^{2+}$, $M^{3+}$ and $M^{4+}$ are divalent, trivalent resp. tetravalent cations selected from the group consisting of $Ca^{2+}$, $Co^{2+}$, $Cu^{2+}$, $Fe^{2+}$, $Mg^{2+}$, $Mn^{2+}$, $Ni^{2+}$, $Zn^{2+}$, $Al^{3+}$, $Ce^{3+}$, $Co^{3+}$, $Cr^{3+}$, $Fe^{3+}$, $Ga^{3+}$, $V^{3+}$, $Si^{4+}$, $Sn^{4+}$, $Ti^{4+}$ and $Zr^{4+}$, wherein there is no need that cations $M^{3+}$ are present or there is no need that cations $M^{4+}$ are present, wherein x is the ratio of trivalent to the sum of divalent and trivalent metal cations $(M^{3+}+M^{4+})/(M^{2+}+M^{3+}+M^{4+})$ which is in the range of from 0.1 to 0.5 or from 0.2 to 0.33, wherein $A^{n-}$ indicates the overall negative charge of intercalated species A with n being in the range of from 0.1 to 100, wherein these anions A and/or molecules A are selected from the group consisting of anions of hydroxide, fluorides, carbonates, nitrates, sulfates, chromate, chromite, molybdates, phosphomolybdates, phosphates, phosphonates, tungstates, vanadates, azoles, carboxylates like benzoates, fumarate, lactate, octanoate, oxalate, phthalate, salicylates and succinates, dodecylbenzenes, phenolic compounds, anionic surfactants and biomolecules like proteins and quinaldics, wherein the LDH particles have been at least partially calcined or wherein the LDH particles have been partially or totally calcined and then rehydrated so that the LDH particles are primarily based on a mixture of substances selected from the group consisting of oxides, double oxides, multiple oxides, hydroxides, at least one LDH phase, anions A and molecules A.

Preferably, the coating composition further contains a surface modifying agent for dispersing, for anti-settling, for stabilizing and/or for long-term stabilizing of the coating composition and/or of its components and/or further contains an agent for modifying the structural viscosity and/or thixotropy of the coating composition. The stabilization may concern physical and/or chemical modification either of the LDH particles' surfaces, of the coating composition or both, e.g. by grafting the LDH particles' surfaces e.g. with a silane/silanol/siloxane, e.g. by physical adsorption of a permeable polymer/copolymer and/or of a biopolymer on the surfaces of LDH particles, e.g. as anti-sedimentation agent, as stabilizing agent for the dispersion quality, especially for long-term stabilization, e.g. a wetting agent and/or e.g. with a surfactant. Such surface modifying agent for the LDH particles is preferably selected from the group consisting of any surfactants, of any silane/silanol/siloxane and any other surface active agents that interact with LDH surface via Van der Waals forces, hydrogen bonding and electrostatic interactions.

Such surface modifying agent for the functionalization of the LDH particles' surface is preferably selected from the group consisting of alcohols, polyols, carboxylic acids, silanes/silanols/siloxanes and any other species chemically bonding to the LDH surface.

The functionalization of LDH particles e.g. with a silane/silanol/siloxane in a separate preparation or modification step prior to their addition to a coating composition may have an important effect on the compatibility between the LDH particles and other constituents of the coating composition and/or on the reduced sedimentation of LDH particles. If needed, there may be used thixotropic compositions.

Preferably, the coating composition or the thereof generated coating contains LDH particles which show a content of a stabilizator on their surface for the LDH colloidal stability to prevent agglomeration and sedimentation, especially in a coating composition being a dispersion or in the thereof generated coating.

The coating composition may be an aqueous solution, an aqueous dispersion, a non-aqueous solution, a non-aqueous dispersion, an emulsion or any combination thereof. The pH of the aqueous coating composition is preferably greater than 3, greater than 3 or greater than 5 and is preferably less than 12, less than 11, less than 10 or less than 9, particularly preferred in a range of from 4 to 12, from 4.5 to 10.5 or from 5 to 9, very particularly preferred in a range of from 5 to 8 or in a range from 6 to 9. The different coating compositions may be prepared with the well known process conditions and steps of the prior art as typical for each type of coating composition.

Preferably, the coating compositions and the thereof generated coating containing LDH particles are used to coat metallic surfaces, which optionally may have already been coated before, e.g. of steels, of other iron based substrates, of zinc and/or aluminium coated steels, of cold-rolled steel (CRS), of hot-dip galvanized (HDG), of electrolytically galvanized steel (EG), of zinc-aluminium, aluminium-zinc or zinc-magnesium alloys like Galfan® (ZA), Galvalume® (GA) and (ZMg), of other aluminium alloys like those on the base of AlCuMg like AA2024 clad and AA2024 unclad, on the base of AlCuLi like AA2050, AA2090 and AA2196, on the base of AlMgSc like AA5024, on the base of AlMg like AA5083, on the base of AlMgSiCu like AA6013 and AA6056 and/or on the base of AlZnMgCu like AA7075, AA7449 and AA7475, of technically pure aluminium, of magnesium alloys like AZ31, EL21, EL43 and WE43, of titanium alloys like Ta6V, of other zinc containing alloys, of technically pure aluminium and/or of technically pure zinc. Such already coated metallic surfaces comprise metallic surfaces that have already been treated e.g. by treatment processes that leave any coating on the metallic surface like any pretreatment layer, any passivation layer, any posttreatment layer, any post-rinsing layer or any oil layer. Preferably, the LDH particles containing coating composition and the thereof generated coating is used to coat surfaces of steel, hot-dip-galvanized steel (HDG), electrogalvanized steel (EG) and/or aluminium alloy or to coat surfaces of steel, hot-dip-galvanized steel (HDG) and/or e-zinc-coated steel (EG). Among the aluminium alloys, the copper containing aluminium alloys especially on the base of AlCuMg like AA2024 are well known to show a relatively low corrosion resistance and represent the strongest challenge for a paint system to establish acceptable corrosion protection properties.

For aluminium alloys, especially for their use for the construction of aircrafts, it is preferred to use as treatment prior to the application of a primer and/or paint composition containing LDH particles either a pickling composition on the base of chromic acid or on the base of chromo-sulphuric acid, an anodization e.g. with an aqueous composition on the base of sulphuric acid, on the base of tartaric acid and sulphuric acid, on the base of phosphoric acid or on the base of phosphoric acid, tartaric acid and sulphuric acid, or on the base of an aqueous conversion coating composition on the base of chromium(III) compound.

Preferably, the object is further on achieved with a method of use of LDH particles for the corrosion inhibition of metallic surfaces with: 1.) LDH particles as nanocontainers, if they contain at least one releasable corrosion inhibiting species A in the intercalating layers, 2.) LDH particles as nanocontainers for releasable corrosion inhibiting anions/molecules adsorbed on the surfaces of LDH particles, 3.) non-calcined LDH particles as nanotraps which are able to entrap primarily anions and/or in a small extent water molecules from the surrounding of the LDH particles and/or 4.) calcined or calcined and rehydrated LDH particles as nanotraps which are able to entrap anions and/or a large extent of water from the surrounding of the LDH particles.

In a more preferred embodiment, the object is further on achieved with a method of use of a coating system for the corrosion inhibition of metallic surfaces which is based on at least two different coatings selected from the group consisting of a pretreatment coating, a primer coating, a paint coating and an electrocoating, wherein each one of these coatings contains LDH particles and/or totally calcined LDH particles. Such coating system may be especially interesting on coils and/or on sheets of aluminium, aluminium alloy, magnesium alloy, aluminium alloy coated steel, zinc coated steel and/or on zinc alloy coated steel.

The method of use may preferably be achieved with: 1.) LDH particles, which may be calcined, calcined and rehydrated or not, as nanocontainers, if they contain at least one releasable corrosion inhibiting species A in the intercalating layers, which may be released into the surrounding, 2.) LDH particles, which may be calcined, calcined and rehydrated or not, as nanocontainers for releasable corrosion inhibiting anions/molecules adsorbed on the surfaces of LDH particles, which may be released into the surrounding, 3.) non-calcined LDH particles as nanotraps which are able to entrap primarily anions and/or in a small extent water molecules from the surrounding of the LDH particles and/or 4.) calcined or calcined and rehydrated LDH particles as nanotraps which are able to entrap anions and/or a large extent of water from the surrounding of the LDH particles. Preferably, the entrapped anions are chloride anions, which typically are the most dangerous anions for corrosion inhibition and degradation of metallic surfaces and which are often contained in aqueous surrounding.

Preferably, the process of the present invention is used for the pretreatment or treatment of metallic surfaces of parts, of coil or coil portions like sheets made of at least one metallic material. Preferably, the coated metallic surfaces of the present invention are used for application in general industry, in automotive industry, in aerospace industry and/or in constructions.

It has now been found that MgAl-based LDH phase with intercalated hydroxide anions and with corrosion inhibiting anions A or with corrosion inhibiting molecules A e.g. on the base of 2-mercaptobenzothiazole MBT adsorbed on the LDH particles' surfaces is excellent for acidic aqueous systems especially in a pH range of from about 3 to about 12 and preferred for zinc containing metallic surfaces to be protected.

It has now been found that LDH particles with corrosion inhibiting anions A or with corrosion inhibiting molecules A e.g. on the base of organic azole based compounds like 2-mercaptobenzothiazole MBT are able to grant hydrophobic properties to the generated coatings. The hydrophobic effect has been proved by contact angle measurements. This effect may be especially useful for a coating which is the most upper coating like a passivation coating, a clear coat coating or a topcoat coating. This effect may be of special relevance e.g. with Zn-based LDH particles in the presence of anions like chloride in the surrounding.

Surprisingly it has now been found that a coating composition or the thereof generated coating that contains additionally at least one corrosion inhibitor A and/or B enhances the corrosion inhibition and optionally even the paint adhesion. The corrosion inhibitor B based on corrosion inhibiting anions and/or substances B may be chemically based on the same corrosion inhibiting anions A and/or molecules A as contained in the LDH particles added to the coating composition and/or on another chemical base. It has been found that a) the combination of MBT as corrosion inhibiting anions A in the LDH particles and additionally added as MBT compound B as well as b) the combination of vanadate anions as corrosion inhibiting anions A in the LDH particles and additionally added MBT compound B give superior results especially to the thereof generated coating.

Surprisingly it has now been found for corrosion inhibiting anions and/or corrosion inhibiting molecules A, that it is possible to use the LDH phase even below a pH of 4, although the LDH phase may at least then be slowly and partially dissolving in the surrounding aqueous solution. The LDH phase itself may work as a pH buffer, especially if it is present in a higher content and/or when $OH^-$ is present as intercalated hydroxide, which is able to be released by anion exchange or dissolution of the LDH particles. This effect was astonishingly found for 2-mercaptobenzothiazole MBT, and it is expected that this effect occurs with quinaldics too.

It has now been found that it is possible in the optimization of the effect of LDH particles in corrosion resistant coatings to increase the total amount of load of corrosion inhibiting anions and/or molecules A and to increase corrosion resistance of the therewith generated coatings. Such LDH particles can be prepared in a preparation process, in which there is not used any washing or only use less washings after the intercalation of the corrosion inhibitor. Nevertheless, care has to be taken, that increasing corrosion resistance is achieved when a) corrosion inhibiting anions and/or molecules A are taken up within the interlayer spacing of LDH and when b) releasable anions and/or molecules A are adsorbed on the outer surfaces of the LDH particles are used at the same time, but then the release of a) and the release of b) will be typically at different time and perhaps the release of b) may not be controlled and perhaps the release of a) may not coincide with the release of b) in the chemical system. Normally, the intercalating corrosion inhibitor a) is more preferred than the adsorbed anions, and the adsorbed corrosion inhibitor b) is sometimes unwanted, mainly in cases where the inhibitor may detrimentally react with components of the coating compositions, especially with an organic polymer/copolymer and/or with at least one silane/silanol/siloxane. Such chemical reactions may be therefore tested before separately and easily by adding this substance to the coating composition. As Table 1 shows, the best coating results are gained with intensive washings after anion exchange. Table 1: Overview over loading and releasing behaviour depending on washing conditions after loading for intercalating anions IA and adsorbed anions AA in freshly prepared LDH particles

| | Anion loading process | Treatment process after anion loading | | | Anion release process |
|---|---|---|---|---|---|
| | | A) without washing | B) with 2 washings | C) with 4 washings | |
| Intercalating anions IA | well | high possible | high possible | high possible | well, controlled |
| Adsorbed anions AA | well | medium possible | certain load | low load | well, un-controlled |
| Loading degree IA | maximum | maximum | maximum | maximum | maximum |
| Loading degree AA | maximum possible | maximum | medium or low | low or negligible | — |
| Quality of coating composition | — | low | good | very good | — |
| Corrosion resistance of coating | — | medium | good | very good | — |

On the other hand, it has now surprisingly been found that it is preferred for singular combinations of differently loaded LDH particles, like for combinations of MBT and vanadate as well as phosphate and vanadate intercalated in the same type of LDH particles, but separately loaded. If such LDH particles are combined in a coating composition, the generated coating shows significantly better corrosion resistance results in comparison to a coating for which the same total amount of only one of these types of loaded LDH particles was added.

It has now been found that it is specifically preferred first to start from a LDH phase containing easily displaceable nitrate and/or chloride anions and then exchange these with anions like such based on azoles like MBT, molybdates, phosphomolybdates, phosphates, quinaldics/quinaldates or vanadates, as it is clearly better to maintain these anions and/or molecules A including even thereof generated compounds intercalated in the LDH particles than having these from the beginning freely accessible in the coating compositions and coatings, as these anions and/or molecules may otherwise affect the thereof generated coatings in view of paint adhesion, passivation and/or corrosion resistance. This effect seems to be independent from the composition of the layers of the LDH structure and phase used, from the cations and from the LDH phases, but only dependent from the corrosion inhibitors.

Surprisingly, there has been now found that there may sometimes occur any self-healing process during the use of a corroding metallic surface covered with a coating containing LDH particles. Measurements e.g. with High Performance Liquid Chromatography indicate that the release of corrosion inhibiting anions may be triggered by a pH change which may e.g. occur by increase of the amount of corrosive chloride anions present and/or by a pH buffer action. Such pH change may then cause the release of corrosion inhibiting species A from the LDH particles. And it is supposed from X-ray diffraction measurements on LDH particles or LDH-modified compositions that it may even happen that corrosion inhibiting species A are released from the LDH particles and that corrosive anions like chloride anions are taken up therefor.

It was surprisingly found that an improved corrosion protection could be gained for LDH particles with adsorbed MBT and intercalated $OH^-$, which is attributed to a combination of passivation of the metallic surface by the increase of pH generated by release of $OH^-$ into the generated coating together with MBT, which actively worked on hindering of corrosion reactions. This effect was especially found on zinc-based substrates and LDH particles on the base of Mg(3)Al(1)-MBT LDH.

It was further on surprisingly found that a strongly improved corrosion protection could be gained by the addition of calcined LDH particles.

It was surprising that the use of the combination of LDH particles on the base of $LDH-VO_x$ and on the base of LDH-MBT have clearly shown to be better in corrosion protection and paint adhesion than the addition of a corrosion inhibitor on the base of MBT or of vanadate each without LDH particles and have clearly shown to be better too than the addition of $LDH-VO_x$ or LDH-MBT alone.

It has now been found that the addition of particles of at least one LDH phase leads to better corrosion inhibition and paint adhesion.

It has now also been found that a combination of at least two types of differently anion loaded LDH particles as well as a combination of one type of anion loaded LDH particles with separate corrosion inhibiting anions B lead to an exceptional increase in quality of the coating.

It has now been found that very different types of LDH particles lead often to very good corrosion resistance of the therewith generated coating—independent on how these particles were prepared, how the LDH particles are loaded with exchanged anions or not, if they are calcined or if they are calcined and rehydrated.

It has now been found that mixtures of very different types of LDH particles may lead to a certain or significant increase of corrosion resistance of the therewith generated coating.

It has further on now been found that the different types of LDH particles may be well distributed in a dispersion without agglomeration, especially when using a pearl mill. When using a pearl mill, it is possible to generate a homogeneous composition and homogeneous coating, especially by avoiding LDH particles' agglomerates and aggregates.

It has further on now been found that the use of LDH particles like for such nanocontainers enables a composition like a primer or paint composition to be conciliatory and compatible with the primer or paint composition used, as the inhibitor is mostly or totally bound to the LDH particles. Therefore, the corrosion inhibiting anions and/or molecules A do mostly not disturb in a chemical system used, of course depending on the amount added, even if such anions or molecules A added separately without such carrying particles would cause problems in the composition. This often leads to a better paintability, longer storage stability and better corrosion resistance.

Because of the excellent possibility to incorporate the LDH particles without or with corrosion inhibiting anions and/or molecules A into these compositions and because of the flawless coatings that may be generated thereof, there occur corrosion resistance results that are often better than those generated today with chromate-free compositions.

Further on, it has now been found that the use of LDH particles containing anions or molecules A and/or of a separate corrosion inhibitor compound B on the base of at least one azole compound like 2-mercaptobenzothiazole MBT is able to grant hydrophobic properties to the generated coatings.

Finally, because of the excellent results by using the different types of LDH particles, it is easily and well possible to avoid cancerous constituents like chromates.

Examples and Comparison Examples

The Examples according to the invention (E) and Comparison Examples (CE) described below are intended to illustrate the subject matter of the invention in greater detail.
Preparation of Samples of LDH Particles:
A1) Synthesis of LDH Phase Precursors by Coprecipitation:

The synthesis started from aqueous solutions of the individual type of cation containing salts either of chlorides or of nitrates which were mixed together according to the wanted stoichiometry. Then this solution was mixed with sodium hydroxide solution to a third container vessel, where the reaction occurred in the presence of the intercalating salt like sodium carbonate or sodium nitrate in excess under constant stirring and control of pH. In addition, ultrasonic vibration could be used if wanted to improve the dispersion and to reduce the particle size of the particulate LDH. Gases were transported away with the aid of flowing inert gas. Then the obtained slurry was placed in a water bath of 100° C. for 4 hours. In addition or alternatively, ultrasonic vibration could be used during this hydrothermal treatment too. Afterwards, a gel was received with the aid of a centrifuge. The LDH was washed in several steps to obtain purified LDH. If wanted, the LDH was conditioned in an aqueous or organic based solvent as a suspension or was dried and stored in powder form.

The coprecipitated particles showed a mean particle size in the range of from 0.01 to 5 μm, as measured with a scanning electron microscope SEM for the diameter of the planes of the plates of the plate-like particles. But the mean height of such particles as measured perpendicular to the plane of the plates with atomic force microscopy AFM or with transmission electron microscopy TEM was in the range of from 2 to 200 nm. Such samples showed mean crystallite sizes of X-ray diffraction XRD measurement in the range of from 2 to 80 nm in direction of the basal spacing of the crystal structure. The particles were often well crystallized.
A2) Anion Exchange of LDH Phase A1 Precursors to LDH Phase:

To exchange the anions in the intercalating layers the LDH precursor of A1) was dispersed in an aqueous solution in which the desired type of anions and/or molecules A was contained. The resulting mixture was left under constant stirring at room temperature for 24 hours and under inert atmosphere blowing. Afterwards, the slurry was centrifuged and washed. The slurry was added to a fresh aqueous solution in which the desired type of anions and/or molecules A was contained in diluted concentration. Then the reaction product was left under constant stirring at room temperature for 24 hours and under inert atmosphere blowing again, to get a more complete reaction. If needed, these process steps were repeated. If wanted, the LDH was conditioned in an aqueous or organic based solvent as a suspension or was dried and stored in powder form. In some cases, the LDH material could be surface functionalized with a stabilizator for the stability of the dispersion, e.g. by chemical reaction with a silane or physical interaction with a surfactant. This LDH material contained the corrosion inhibiting anions or molecules A, were in the desired condition and were ready for addition to a coating composition. The mean crystallite sizes as mentioned for A1) often decrease upon anion exchange, which may perhaps be a result of mechanical fragmentation due to differences in the size of displacing and displaced anions. The particles were well crystallized.

B1) Partial or Total Calcination of Synthetic Hydrotalcite Particles:

It was started from synthetic hydrotalcite, which is a particulate LDH material on the base of $Mg_6Al_2$—$[(OH)_{16}CO_3].4H_2O$ inclusive similar compositions like $Mg_4Al_2[(OH)_{12}CO_3].3H_2O$ and $Mg_6Al_2[(OH)_{16}CO_3].5H_2O$. Its ability to exchange anions was a bit minor than for fresh prepared LDH material. For total calcination, it may occur that a small or even high extent of these anions and molecules A will go lost during calcination. For partial calcination, the amount of these anions and molecules A may be smaller. The particles were well crystallized.

The particulate hydrotalcite was heated in a furnace up to temperatures in the range of from 300 to 650° C. in air. Depending on maximum temperature and the heating and cooling rates, a certain degree of calcination was reached. Details may be seen from Tables 2 and 3. Either after the calcination or only after the rehydration—if performed—, the particulate LDH material was milled in a ball mill with addition of ethanol and zirconia balls over 2 to 24 hours. After milling of calcined samples, the particles showed a mean particle size in the range of from 0.01 to 5 µm, as measured with a scanning electron microscope SEM for the diameter of the planes of the plates of the plate-like particles. But the mean height of such particles as measured perpendicular to the plane of the plates with transmission electron microscopy TEM was in the range of from 2 to 200 nm. Such samples showed mean crystallite sizes of X-ray diffraction XRD measurement in the range of from 2 to 80 nm in direction of the basal spacing of the crystal structure. But the morphology of the calcined LDH particles is different after calcination, although the particles were mostly well crystallized.

B2) Rehydration and Structural Reconstruction of Partially or Totally Calcined Synthetic Hydrotalcite Particles in Presence of Corrosion Inhibiting Anions or Molecules a to Partially Rehydrated Hydrotalcite Particles:

The rehydration and often occurring structural reconstruction of partially or totally calcined synthetic hydrotalcite material was performed in a bath with water or aqueous solution of a salt with corrosion inhibiting anions A and/or of molecules A. On demand, the rehydration was performed over 4 to 72 hours by immersing the calcined synthetic hydrotalcite material.

Afterwards, the slurry was centrifuged and washed in ion-free water. The slurry may have been added to a fresh aqueous solution in which the desired type of anions and/or molecules A was contained in diluted concentration for further intercalation of anions and/or molecules A. Then the rehydrated product was left under constant stirring at room temperature for 24 hours and under inert atmosphere blowing. If needed, these process steps were repeated. If wanted, the LDH was conditioned in an aqueous or organic based solvent as a suspension or was dried and stored in powder form. In some cases, the LDH material could be surface functionalized with a stabilizator for the stability of the dispersion, e.g. by chemical reaction with a silane or physical interaction with a surfactant. This LDH material containing the corrosion inhibiting anions and/or molecules A was in the desired condition and was ready for addition to a coating composition.

Then, the particulate LDH material was milled in a ball mill with addition of ethanol and zirconia balls over 2 to 24 hours. After milling the calcined and rehydrated samples, the particles showed a mean particle size in the range of from 0.1 to 5 µm, as measured with a scanning electron microscope SEM for the diameter of the planes of the plates of the plate-like particles. The mean height of such particles as measured perpendicular to the plane of the plates with atomic force microscopy AFM or with transmission electron microscopy TEM was in the range of from 2 to 200 nm. Such samples showed mean crystallite sizes of X-ray diffraction XRD measurement in the range of from 2 to 80 nm in direction of the basal spacing of the crystal structure. The obtained LDH particles were well crystallized.

The particulate LDH materials of different preparation processes showed a loading degree with corrosion inhibiting anions and/or molecules A in a range of from 5 to 40% by weight for coprecipitated and anion exchanged LDH materials and in a range of from 3 to 25% by weight for at least partially calcined, rehydrated and anion loaded LDH materials, depending on the quality and succession of the different process steps.

Tables 2 and 3: Starting Materials, Preparation Conditions and Properties for Different Types of LDH Particles:

VC=use of ultrasonic vibrating cell for reduction of agglomeration and particle size during coprecipitation; Stabiliz.=stabilizator for the stabilization of the aqueous dispersion after synthesis; during LDH phase precursor preparation: first step=addition of chemicals and second step=reaction; Atm.=atmosphere of coprecipitation; SH=synthetic hydrotalcite; all samples showed plate-like particles.

| LDH phase precursor | Sample | Preparation and treatment conditions | Thermal tr. | VC | Exchanged to | Atm. |
| --- | --- | --- | --- | --- | --- | --- |
| Zn(2)Al(1)—NO$_3$ | A1 | Coprecipitation | 100° C. 4 h | — | — | Ar—N$_2$ |
| Zn(2)Al(1)—NO$_3$ | A2 | Coprecipitation, VC only in first step | 100° C. 4 h | VC | — | Ar—N$_2$ |
| Zn(2)Al(1)—NO$_3$ | A3 | Coprecipitation, VC in first and second step | — | VC | — | Ar—N$_2$ |
| Mg(2)Al(1)—NO$_3$ | A4 | Coprecipitation | 100° C. 4 h | — | — | Ar—N$_2$ |
| Mg(3)Al(1)—NO$_3$ | A5 | Coprecipitation | 100° C. 4 h | — | — | Ar—N$_2$ |
| Zn(2)Cr(1)—NO$_3$ | A6 | Coprecipitation | 100° C. 4 h | — | — | Ar—N$_2$ |
| Zn(2)Al(1)—NO$_3$ | A7 | Coprecipitation/anion exchange | 100° C. 4 h | — | NO$_3$ → MoO$_4$ | Ar—N$_2$ |
| Zn(2)Al(1)—NO$_3$ | A8 | Coprecipitation, VC in first step, anion exchange | 100° C. 4 h | VC | NO$_3$ → MoO$_4$ | Ar—N$_2$ |
| Zn(2)Al(1)—NO$_3$ | A9 | Coprecipitation | 100° C. 4 h | — | — | Ar—N$_2$ |
| Zn(2)Al(1)—NO$_3$ | A10 | Coprecipitation/anion exchange | 100° C. 4 h | — | NO$_3$ → VO$_x$ | Ar—N$_2$ |
| Zn(2)Al(1)—NO$_3$ | A11 | Coprecipitation, VC in first step, anion exchange | 100° C. 4 h | VC | NO$_3$ → VO$_x$ | Ar—N$_2$ |
| Zn(2)Al(1)—NO$_3$ | A12 | Coprecipitation/anion exchange | 100° C. 4 h | — | NO$_3$ → H$_x$PO$_4$ | Ar—N$_2$ |
| Zn(2)Al(1)—NO$_3$ | A13 | Coprecipitation/anion exchange | 100° C. 4 h | — | NO$_3$ → salicylate | Ar—N$_2$ |
| Mg(2)Al(1)—NO$_3$ | A14 | Coprecipitation/anion exchange | 100° C. 4 h | — | NO$_3$ → MBT | Ar—N$_2$ |

-continued

| LDH phase precursor | Sample | Preparation and treatment conditions | Thermal tr. | VC | Exchanged to | Atm. |
|---|---|---|---|---|---|---|
| Mg(3)Al(1)—NO$_3$ | A15 | Coprecipitation/anion exchange | 100° C. 4 h | — | NO$_3$ → MBT | Ar—N$_2$ |
| Mg(3)Al(1)—NO$_3$ | A16 | Coprecipitation/anion exchange | 100° C. 4 h | — | NO$_3$ → VO$_x$ | Ar—N$_2$ |
| Zn(2)Cr(1)—NO$_3$ | A17 | Coprecipitation/anion exchange | 100° C. 4 h | — | NO$_3$ → MoO$_4$ | Ar—N$_2$ |
| Ca(2)Al(1)—CO$_3$ | A18 | Coprecipitation | 100° C. 4 h | — | — | Air |
| Zn(2)Co(1)Co(0.8)—CO$_3$ | A19 | Coprecipitation | 100° C. 4 h | — | — | Air |
| Mg(3)Al(1)Ce(0.05)—CO$_3$ | A20 | Coprecipitation | 100° C. 4 h | — | — | Air |
| Ni(2)Cr(1)—CO$_3$ | A21 | Coprecipitation | 100° C. 4 h | — | — | Air |
| Fe(2)Fe(1)—CO$_3$ | A22 | Coprecipitation | 100° C. 4 h | — | — | Air |
| Mg(3)Ga(1)—CO$_3$ | A23 | Coprecipitation | 100° C. 4 h | — | — | Air |
| Ni(4)Mn(1)—CO$_3$ | A24 | Coprecipitation | 100° C. 4 h | — | — | Air |
| Mg/Al/Zr$^{IV}$—CO$_3$ | A25 | Coprecipitation | 100° C. 4 h | — | — | Air |
| Mg/Al/Sn$^{IV}$—CO$_3$ | A26 | Coprecipitation | 100° C. 4 h | — | — | Air |
| (Co,Ni)$^{II}$/Al/Sn$^{IV}$—CO$_3$ | A27 | Coprecipitation | 100° C. 4 h | — | — | Air |
| (Mg,Ni,Zn)$^{II}$/Al/Sn$^{IV}$—CO$_3$ | A28 | Coprecipitation | 100° C. 4 h | — | — | Air |
| Mg/Al/Si$^{IV}$—CO$_3$ | A29 | Coprecipitation | 100° C. 4 h | — | — | Air |
| Mg/Al/Ti$^{IV}$—CO$_3$ | A30 | Coprecipitation | 100° C. 4 h | — | — | Air |
| Mg/Al/Zr$^{IV}$—CO$_3$ | A31 | Coprecipitation | 100° C. 4 h | — | — | Air |
| Zn/Ti$^{IV}$—CO$_3$ | A32 | Coprecipitation | 100° C. 4 h | — | — | Air |
| Zn/Zr$^{IV}$—CO$_3$ | A33 | Coprecipitation | 100° C. 4 h | — | — | Air |
| Cu/Ni/Al—CO$_3$ | A34 | Coprecipitation | 100° C. 4 h | — | — | Air |
| Cu/Ni/Mg/Al—CO$_3$ | A35 | Coprecipitation | 100° C. 4 h | — | — | Air |
| Co(2)Al(1)—CO$_3$ | A36 | Coprecipitation | 100° C. 4 h | — | — | Air |
| Fe(2)Al(1)—CO$_3$ | A37 | Coprecipitation | 100° C. 4 h | — | — | Air |
| Ni(3)Al(1)—CO$_3$ | A38 | Coprecipitation | 100° C. 4 h | — | — | Air |
| Mg(2)Mn(1)—CO$_3$ | A39 | Coprecipitation | 100° C. 4 h | — | — | Air |
| Mg(2)Al(1)—NO$_3$ | A40 | Coprecipitation/anion exchange | 100° C. 4 h | — | NO$_3$ → monoaminophosphonate | Ar—N$_2$ |
| Mg(2)Al(1)—NO$_3$ | A41 | Coprecipitation/anion exchange | 100° C. 4 h | — | NO$_3$ → phosphomolybdate | Ar—N$_2$ |
| Mg(2)Al(1)—NO$_3$ | A42 | Coprecipitation/anion exchange | 100° C. 4 h | — | NO$_3$ → oxalate | Ar—N$_2$ |
| Mg(2)Al(1)—NO$_3$ | A43 | Coprecipitation/anion exchange | 100° C. 4 h | — | NO$_3$ → benzoate | Ar—N$_2$ |
| Mg(2)Al(1)—NO$_3$ | A44 | Coprecipitation/anion exchange | 100° C. 4 h | — | NO$_3$ → benzotriazole | Ar—N$_2$ |
| Mg(2)Al(1)—NO$_3$ | A45 | Coprecipitation/anion exchange | 100° C. 4 h | — | NO$_3$ → quinaldate | Ar—N$_2$ |
| Mg(2)Al(1)—NO$_3$ | A46 | Coprecipitation/anion exchange | 100° C. 4 h | — | NO$_3$ → dodecylbenzenesulfonate | Ar—N$_2$ |
| Zn(2)Al(1)—NO$_3$ | A47 | Coprecipitation/anion exchange | 100° C. 4 h | — | NO$_3$ → MBT | Ar—N$_2$ |
| Zn(2)Al(1)—NO$_3$** | A48 | Coprecipitation/anion exchange | 100° C. 4 h | — | NO$_3$ → VO$_x$, then functionalized | Ar—N$_2$ |
| Mg(2)Al(1)—CO$_3$ | A49 | Coprecipitation/anion exchange | 100° C. 4 h | — | CO$_3$ → PO$_4$ | Ar—N$_2$ |
| Mg(2)Al(1)—NO$_3$ | A66 | Coprecipitation/anion exchange, paste—like | — | — | NO$_3$ → VO$_x$ | Ar—N$_2$ |
| Mg(2)Al(1)—NO$_3$ | A67 | Coprecipitation/anion exchange, suspension | — | — | NO$_3$ → MBT | Ar—N$_2$ |
| Zn(2)Al(1)—NO$_3$ | A68 | Coprecipitation/anion exchange | 100° C. 4 h | — | NO$_3$ → MBT | Ar—N$_2$ |

**further surface functionalized particles with aminopropyltriethoxysilane APS by immersion in a diluted aqueous and ethanolic APS solution for few hours, afterwards several times washed and then dried,

| Starting LDH phase | Sample | Treatment conditions of calcination and LDH phase presence | | | Rehydration: anion type and anion concentration, time of aqueous immersion and of stirring the immersion | | | |
|---|---|---|---|---|---|---|---|---|
| SH starting material | A50 | — | — | — | — | — | — | — |
| SH | A51 | Total calcination: no LDH phase present | 650° C. 2 h | +1°/min −10°/min | — | — | — | — |
| SH | A52 | Total calcination: no LDH phase present | 650° C. 2 h | +1°/min −10°/min | MoO$_4$ | 0.1 mol | 48 h | 24 h |
| SH | A53 | Total calcination: no LDH phase present | 650° C. 2 h | +1°/min −10°/min | VO$_x$ | 0.1 mol | 48 h | 24 h |
| SH | A54 | Partial calcination: still LDH phase present | 300° C. 2 h | +1°/min −10°/min | MBT | 0.1 mol | 48 h | 24 h |
| SH | A55 | Partial calcination: no LDH phase present | 400° C. 2 h | +1°/min −10°/min | MBT | 0.1 mol | 48 h | 24 h |
| SH | A56 | Partial calcination: no LDH phase present | 500° C. 2 h | +1°/min −10°/min | MBT | 0.1 mol | 48 h | 24 h |
| SH | A57 | Total calcination: no LDH phase then detect. | 650° C. 2 h | +1°/min −10°/min | MBT | 0.1 mol | 48 h | 24 h |
| SH | A58 | Total calcination: no LDH phase present | 650° C. 2 h | +1°/min −10°/min | H$_x$PO$_4$ | 0.1 mol | 48 h | 24 h |
| SH | A59 | Total calcination: no LDH phase present | 650° C. 2 h | +1°/min −10°/min | thiosalicylate | 0.1 mol | 48 h | 24 h |
| Mg(3)Al(1)—NO$_3$+ * | A60 | Partial calcination: still LDH phase present | 300° C. 2 h | +1°/min −10°/min | — | — | — | — |
| Zn(2)Al(1)—NO$_3$+ * | A61 | Partial calcination: no LDH phase present | 300° C. 2 h | +1°/min −10°/min | — | — | — | — |
| Zn(2)Al(1)—NO$_3$ | A62 | Partial calcination: no LDH phase present | 300° C. 2 h | +1°/min −10°/min | H$_x$PO$_4$ | 0.1 mol | 48 h | 24 h |
| Zn(2)Al(1)—NO$_3$ | A63 | Nearly total calcination: no LDH phase present | 450° C. 2 h | +1°/min −10°/min | H$_x$PO$_4$ | 0.1 mol | 48 h | 24 h |
| Zn(2)Al(1)—NO$_3$ | A64 | Total calcination: no LDH phase present | 650° C. 2 h | +1°/min −10°/min | H$_x$PO$_4$ | 0.1 mol | 48 h | 24 h |
| Mg(3)Al(1)—NO$_3$ | A65 | Total calcination: no LDH phase present | 650° C. 2 h | +1°/min −10°/min | H$_x$PO$_4$ | 0.1 mol | 48 h | 24 h |

SH = synthetic hydrotalcite
* + anion exchange NO$_3$ to CO$_3$ under storage condition The LDH sample A49 is a result of anion exchange of a carbonate based LDH precursor that contained only a very low content of phosphate anions replacing carbonate. The corrosion inhibiting anions and/or molecules A of the coprecipitated LDH phases were primarily or only intercalated in the LDH particles, but the corrosion inhibiting anions and/or molecules A of the SH samples were primarily or only located on the outside surface of the LDH particles. The term "LDH phase" relates only to the typical LDH structures and not to all structure variations covered by the broad term covering even LDH-like phases.

The following coating compositions are used in the following examples and comparison examples to be applied on clean or on cleaned metal sheets:

1.) As aqueous pretreatment compositions, to which the LDH particles were added as powder, paste or suspension:
B1=composition on the base of a water glass and a Zr compound at a pH of 9±1;
B2=composition on the base of a water glass and an aminosilane of pH 11±0.5;
B3=composition on the base of an aminosilane and a bis-silane of pH 4±0.5.
B4=composition on the base of the gamma-aminopropyltriethoxysilane APS of pH 9±0.5.
B5=composition on the base of at least one organofunctional silane, of a titanium and/or zirconium compound, of metal cations and of at least one additive of pH 4±0.5.

2.) As aqueous passivation compositions, to which the LDH particles were added as suspension:
B6=inorganic composition on the base of zinc phosphate, complexing agent, further cations, silane and additives of pH 5.5±0.5,
B7=inorganic-organic composition on the base zinc phosphate, complexing agent, further cations, silane, cationic organic polymer and additives of pH 6±0.5, 3.) As pretreatmentprimer compositions, to which the LDH particles were added as powder or suspension:
C1=pretreatmentprimer on the base of a polymer system of a commercial aqueous organic composition of pH 8.5±0.5 containing polycarbonate and additives.
C2=water-free pretreatmentprimer on the base of reactive thinners, organic polymer, photoinitiator, corrosion inhibitors and additives.
There was not applied any pretreatment composition prior to the application of the pretreatmentprimer composition.

4.) As primer composition, to which the LDH particles were added as powder or suspension:
D1=non-aqueous composition on the base of water-free epoxy amine resin, organic solvent, blocked isocyanates and additives, free of corrosion inhibiting nanoparticles; prior to the application of the primer coating, first a pretreatment composition on the base of organic polymer/copolymer, phosphate, silane/silanol/siloxanes and metal cations was applied to generate the pretreatment coating.
D2=aqueous primer composition on the base of: 30% by weight of an aqueous emulsion of bisphenol-A-diglycidylether with a resin content of 38% m/m, 16% by weight of titanium dioxide particles, 3% by weight of zinc phosphate particles, 17% by weight of talcum powder, 2.5% by weight of precipitated silicic acid as matting particles, 7.5% by weight of dispersant, 7% by weight of an alcohol mixture and 12% by weight of water, here calculated to a sum of 100% by weight for a content of 5% by weight of LDH particles. As hardening component for D2, a polyamine adduct with a concentration of NH of 250 mol/kg was used.
D3=aqueous primer composition on the base of 31% by weight of an aqueous dispersion of polyurethane resin with a resin content of 40% m/m, 20% by weight of titanium dioxide particles, 3% by weight of zinc phosphate particles, 13% by weight of talcum powder, 2% by weight of precipitated silicic acid as matting particles, 7% by weight of dispersant, 3% by weight of an alcohol mixture and 16% by weight of water, here calculated to a sum of 100% by weight for a content of 5% by weight of LDH particles. As hardening component for D3, a mixture of 90% by weight of an aliphatic oligomeric isocyanate with a concentration of isocyanate of 20 mol/kg and of 10% by weight of a solvent or solvent mixture was used.

5.) As electrocoating composition, to which the LDH particles were added as suspension, to generate an e-coat on a silane based pretreatment coating:
E1=commercial aqueous organic cathodic electrodeposition coating composition on the base of an epoxy resin of pH 5.5±0.5. There was applied a silane and zirconium based pretreatment composition prior to the application of the electrocoating composition.

6.) As paint composition, to which the LDH particles were added as powder or suspension, to generate a basecoat or topcoat coating:
F1=aqueous composition, which may be used for a basecoat or topcoat, which has a similar composition like D2 mentioned above, but with a higher resin content. The generated coatings were grey and not transparent, but easily other colors could be generated instead of grey.
F2=aqueous composition, which may be used for a basecoat or topcoat, which has a similar composition like D3 mentioned above, but with a higher resin content. The generated coatings were grey and not transparent, but easily other colors could be generated instead of grey.

Examples and comparison examples for pretreatment and passivation compositions as shown in the Tables 4 to 8:

Several aqueous coating compositions were prepared on the base of DI water, to which the base composition with the main constituents of a pretreatment composition, the LDH particles and optionally further components were added. As base composition B1, an aqueous diluted composition on the base of potassium water glass and a Zr compound of pH 9±0.5 was used. On demand, an additional amount of a corrosion inhibitor B like 2-mercaptobenzothiazole MBT or an additional amount of a surface modifying agent especially for the stabilization of the aqueous dispersion was added. For the first series of pretreatment compositions prior to organic coating, Table 4 shows the excellent results of the examples E1 to E6 in comparison to the comparison examples CE7 to CE9 of identical, but LDH-free compositions and in comparison to comparison example CE10 of a typical and commercially used chromate based pretreatment composition. Onto hot-dip galvanized steel sheets of automobile quality, HDG EA, these compositions were applied by bar-coating in a laboratory, so that—even because of a very slight waviness of these sheets, slight differences of the applied liquid and dry film occurred. After drying at 80° C. peak-metal-temperature p.m.t., a two-component paint system P1 consisting of an architectural primer of about 5 μm dry film thickness and of an architectural topcoat of about 20 μm dry film thickness were applied. Then testing was performed for neutral salt spray test NSST according to DIN EN ISO 9227 and for T-bend test according to DIN EN 13523-7. For NSST, data were typically measured on three different panels each. For T-bend test, the data were typically measured on four surfaces of two different panels each. For paint adhesion data of a T-bend test, data T0 or T1 in the range of 0 to 5 are excellent data, so that the data for the LDH containing coatings are really excellent. CE 10 for the chromate standard indicates already very good data for corrosion resistance and paint adhesion.

Practically the same excellent results were gained for experiments in Table 4, in which the same compositions and conditions were maintained, but where the LDH particles A11 were exchanged against the LDH particles A66, which were not diminished during preparation, as no vibrating cell VC was used.

For the compositions of comparison examples CE7 to CE9, no LDH particles were added, but the same concentrations and the same addition of MBT as separate corrosion inhibitor B were used like in the examples according to the invention, showing for low MBT contents significantly worse corrosion resistance, and always—independent from MBT concentration—a much worse paint adhesion.

The commercial chromate composition Gardobond® C 4504 was added to DI water to gain a concentration of 45 g/L of bath solution for CE10. The resulting coating weight was about 17 mg/m$^2$ Cr. Because of this relative high Cr coating weight, the data for the LDH containing pretreatments of only 3 to 8 mg/m$^2$ indicate that even a very small addition of LDH particles respectively of a very small addition of LDH particles together with a very small or small additional amount of a corrosion inhibitor results in really superior coating properties.

In Table 5, the influence of the amount of different particulate LDH materials was studied, of a combination of different particulate LDH materials and of an optional addition of a separate corrosion inhibitor B.

In Table 5 for pretreatment compositions, the positive effect of the addition of LDH particles and optionally of a separately added corrosion inhibitor B of another kind of corrosion inhibiting anions (E18) is clearly demonstrated. The inventive effect a) of the addition of LDH particles and b) of the addition of a separate corrosion inhibitor B on improved corrosion resistance or on improved corrosion resistance and paint adhesion are shown very clearly.

Practically the same excellent results as for A11 and A66 were gained for experiments, in which the same compositions were used and where the same conditions were maintained, but where the LDH particles A11 were exchanged against the LDH particles of different preparation, of different base composition and/or of different loading with anions and/or molecules A, as shown in the Tables 5 to 7.

The neutral salt spray testing data found there are acceptable to excellent. The T-Bend test data in the range of from <5 to 6 are excellent, but only such of 0 are superior for such coatings. E11 was prepared again and is comparable with E4. E13 shows that a too high addition of LDH particles may sometimes lead to worse results, perhaps as it may occur that too many sites within the film may be disturbing.

Additionally, in some cases as shown in Table 6, a surface modifying agent was added for the stabilization of the LDH dispersion in an intermediate preparation stage or in a final stage, which is in general preferably added in an amount of 0.001 to 2% by weight.

In Table 7, comparable results were achieved with different pretreatment compositions.

In Table 8, in which the same resp. similar compositions were used and where the same conditions were maintained too, the LDH particles A11 were used in a commercial pretreatment composition and in two different passivation compositions, but also mixtures of different LDH particles of different preparation process, of different composition and of different anion loading were tested.

Examples and comparison examples for primer compositions, pretreatmentprimer compositions and electrocoating compositions as shown in the Tables 9 and 10:

In Table 9, surfaces of electrogalvanized steel (EG) were tested with a non-aqueous primer composition containing calcined, calcined and rehydrated resp. coprecipitated LDH particles.

In Table 10, surfaces of Galvalume® coated steel sheets (GA) and of hot dip galvanized steel sheets (HDG) were tested with an aqueous resp. non-aqueous pretreatmentprimer composition and with an aqueous electrocoating composition. Here, a comparison of the use of differently prepared LDH particles is shown by using additionally calcined and calcined and rehydrated LDH particles.

Aqueous and non-aqueous coating compositions were prepared on the base of DI water or on the base of at least one organic solvent or reactive diluent. To the base composition with the main constituents of a non-aqueous primer composition, of an aqueous or a non-aqueous pretreatmentprimer composition or of an aqueous cathodic electrodeposition coating composition, LDH particles and optionally a further component like an additive were added. For the non-aqueous primer composition, the LDH particles were added prior to a milling step with a pearl mill. Prior to coating of the compositions D1 and E1, a pretreatment was applied as mentioned above. The coating compositions were applied with a bar coater. The wet coatings of C1 were dried at 80° C. peak-metal-temperature p.m.t. For C2, UV radiation was used to crosslink the dry coating. For D1 and E1, a temperature in the range of 150 to 250° C. was used depending on the required crosslinking conditions. No further organic coating was applied afterwards. Then testing was performed. For NSST, data were typically measured on three different panels each.

General Instruction for the Production of Primer Resp. Paint Compositions D2, D3, F1 and F2 of Tables 11 to 13:

First, water and organic solvent were mixed in a water jacket for cooling. Then additives like those which are typically used for primer or paint compositions like a defoamer, a wetting agent and/or an anti-fouling-additive were added to the mixture by stirring with a tooth wheel at a peripheral speed of 900 to 1000 rpm in a dissolver. Then all powdery additions like coloring and whitening pigments, e.g. titanium dioxide, like fillers, e.g. talcum, and like corrosion inhibiting pigments, e.g. zinc phosphate, were added in the same way, but at a peripheral speed of 900 to 2000 rpm. Then, if wanted, LDH particles were admixed, prior to further 15 minutes of stirring at a peripheral speed of 2000 rpm. The LDH particles could be added as powder or—more preferred—as dispersion. In the following, the tooth wheel is replaced with a polyethylene disc. Pearls of glass were then added under stirring into the slurry, preferably under conditions to generate a spout effect. Then the slurry was milled in a dissolver at a peripheral speed of 2000 to 3000 rpm. The slurry showed a milling degree of 20 μm maximum after milling as measured according to ISO 1524 with a fineness of grind. Then the glass pearls were sieved. Now the emulsion and/or dispersion of the organic binder were added under stirring in a dissolver by using again a tooth wheel. Then further additives like a leveling agent, a matting pigment and/or a solvent as filmforming agent were added under stirring. To avoid agglomeration, it was stirred at a peripheral speed of 900 to 1000 rpm. Further on, a rheological agent and water were admixed. In the case that LDH particles should be used which are more sensitive under strong stirring, such particles should be only added now at a peripheral speed of 900 to 1000 rpm. Finally, the slurry was now stirred for gaining a homogeneous dispersion at a peripheral speed of 1000 to 1500 rpm for 15 minutes, and the water content of these masterbatches was adjusted, if necessary. Typical for the primer and paint compositions of Tables 12 and 13, the content of nonvolatile constituents of the masterbatches should be in a range of from 64 to 68% by weight.

For the examples and comparative examples for D2, D3, F1 and F2 of Tables 11 to 13, as crosslinking hardener, a commercially available polyamine adduct was used for the epoxy based compositions, whereas an aliphatic oligomeric isocyanate with 20 mol/kg of isocyanate groups and with an organic solvent were used for the polyurethane based compositions. Prior to its application, the hardener was admixed to these epoxy resp. polyurethane based masterbatches in a weight ratio of 1:1 with relation to the amount of epoxy groups and NH groups resp. in a weight ratio of 1:1.5 with relation to the amount of hydroxy groups and isocyanate groups. These compositions were manually agitated until homogeneity and were diluted with water to be ready for application.

As paint compositions F1 and F2, similar compositions like those of D2 resp. D3 were prepared in the same manner by using the same hardeners. The compositions D2 resp. D3 were then applied to surfaces to sheets of aluminium alloy AA2024 unclad, which had been treated before either by a pickling composition on the base of chromic acid or by an anodization with an aqueous composition on the base of tartaric acid and sulphuric acid. The variation of these two alloys and the two types of "pretreatment" are herein summarized under "A)" and in the corresponding fields of properties of the Tables 11 and 12.

The sheets A) were coated with the primer composition D2 or D3 with the aid of a paint spraying gun system SATA jet 3000 at 2.5 bar spray pressure. During crosswise working on one side of each sheet at 21° C. and 50% humidity of the surrounding air, a wet coating of about 50 μm was applied, which corresponds with a primer coating of about 20 μm. These sheets were dried and aged over seven days at room temperature or with a flash off time for 15 min at RT and following in an oven for 1 hour at a temperature of up to 80° C.

The paint compositions F1 and F2 were applied on primed sheets of aluminium alloy AA2024 which are called here A1). These sheets had been first cleaned in the commercially available standard alkaline degreasing solution Metaclean® T2001 or in the standard alkaline cleaning solution P3 Almeco® 51 and in the standard acid desmutting solution Turco® Liquid Smut Go NC, rinsed in water and dried, pretreated with an aqueous conversion coating composition on the base of a chromium(III) compound and of a zirconium complex fluoride, dried and then coated with a primer coating of the composition D3 like in comparison example CE78 of 20 μm dry film coating and finally after drying and aging the primer coating in the identical way coated with the top-coat compositions F1 or F2 by spraying with the aid of a paint spraying gun system and treating these such coated sheets in the same way as the primer coatings before. Then the such coated sheets were dried at room temperature over 7 days or with a flash off time for 15 min at RT and following in an oven for 1 hour at a temperature of up to 80° C. In this way, coatings of around 20 μm thickness were generated, which could be used as a basecoat or topcoat.

For the production of coating systems based on at least two different types of coatings containing LDH particles of Table 13:

The different compositions were applied on sheets of aluminium alloy AA2024 unclad which are called here A1) in the same manner as mentioned above, but with exceptions mentioned in the following. These sheets had been first cleaned in an alkaline cleaning solution, rinsed and dried as mentioned above for F1 and F2, pretreated with an aqueous conversion coating composition B5 on the base of organofunctional silane, of a titanium and zirconium compound, of metal cations, of additives and optionally of 1% by weight of LDH-particles A11, dried and then coated with a primer coating of the composition D3 optionally containing 5% by weight of LDH particles A16 like in example E83 of 20 μm dry film coating and finally dried and aged over seven days at room temperature or with a flash off time for 15 min at RT and following in an oven for 1 hour at a temperature of up to 80° C.

Then the sheets coated with two different coatings were ready. For the sheets coated with three different coatings, the aforementioned process was first used. Then the topcoat composition F1 optionally containing 5% by weight of LDH particles A68 like in example E86 was applied and dried in the same manner as mentioned above to generate topcoat coatings of around 20 μm thickness. When using LDH particles showing a content of MBT anions as in example E93, a hydrophobic topcoat surface was obtained showing a contact angle in a range of from 100° to 120°, so that a certain hydrophobicity of the surface of the generated coating enables anti-contamination properties.

The coated sheets especially of the samples of Tables 11 to 13 were tested in the following tests:

1.) Salt spray test according to DIN EN ISO 9227 was performed after countersinking a cross "X" by engraving with a gravograph until damaging the metallic material. Continuous salt spraying of 5% aqueous sodium chloride solution was carried out for 3000 h in a salt spray chamber. Determination of the degree of corrosion creepage from the scratch according to ISO 4628-8 and the extent of blistering according to ISO 4628-2: Creepage results were evaluated in comparison to the reference system. No blisters allowed: 0 (S0).

2.) Filiform Test according to DIN EN 3665 was performed after countersinking a "T" by engraving with a gravograph until damaging the metallic material, test over 1 h in fuming hydrochloric acid at room temperature and then 1000 h in a climate chamber at 40° C. and 80% air humidity. Determination of the six longest corrosion filaments and their average value.

3.) Adhesion Test according to DIN EN ISO 2409 with adhesive strip Tesa® 4657: Adhesion of Gt 0 required.

4.) Bending the coated sheet over a mandrel of 2 mm diameter in a mandrel bend test according to ISO 1519 at room temperature. No cracks in the coating allowed. All other tests B): All test results have to be within the required data ranges.

5.) Scratch resistance according to ISO 1518 with a handheld Erichsen tester with a spike of 1 mm. No fracturing of the coating allowed for visual inspection.

6.) 14 days storage time in water at room temperature according to ISO 2812-2 with additional test 3 (Adhesion) and test 5 (Scratch resistance) as well as with visual determination of the extent of blistering according to ISO 4628-2. Adhesion: Maximum of Gt 1 allowed. Scratch resistance: At least 12 N required without damaging the paint coating down to the substrate material. No blisters allowed: 0 (S0).

7.) 1000 h storage time in Skydrol LD-4, an approved phosphoric acid ester hydraulic fluid, at 70° C. according to ISO 2812-1 with additional test 5 (Scratch resistance) after cleaning with petroleum spirit. Scratch resistance: At least 12 N required without damaging the paint coating down to the substrate material.

The results of these tests are summarized for all these variations of metallic surfaces and of pretreatments A) in Tables 12 and 13.

TABLE 4

Overview of the coating compositions and properties of coatings based on pretreatment composition B1 depending on the amount and type of coprecipitated and anion exchanged LDH particles and a corrosion inhibitor B in comparison to chromate

| Addition/Property/ Example | Sample | E1 | E2 | E3 | E4 | E5 | E6 | CE7 | CE8 | CE9 | CE10 |
|---|---|---|---|---|---|---|---|---|---|---|---|
| Aqueous pretreatment base composition | | B1 | B1 | B1 | B1 | B1 | B1 | B1 | B1 | B1 | GB C 4504 |
| Concentration of aqu. base composition | | 1% w | 1% w | 1% w | 1% w | 1% w | 1% w | 1% w | 1% w | 1% w | 0 |
| $Zn(2)Al(1)$— $VO_x$ VC | A11 | A11 | A11 | A11 | — | — | — | — | — | — | — |
| $Mg(2)Al(1)$— $VOx$ | A66 | — | — | — | A66 | A66 | A66 | — | — | — | — |
| LDH content | | 1% w | 1% w | 1% w | 1% w | 1% w | 1% w | 0 | 0 | 0 | 0 |
| Additional corrosion inhibitor B = MBT | | 0 | 0.01% w | 0.1% w | 0 | 0.01% w | 0.1% w | 0 | 0.01% w | 0.1% w | 0 |
| Coating weight for Si about . . . mg/m$^2$ | | 3 | 7 | 3 | 7 | 7 | 7 | 4 | 8 | 8 | 0 |
| Paint system | 15 + 20 μm | P1 | P1 | P1 | P1 | P1 | P1 | P1 | P1 | P1 | P1 |
| Metallic surface | | HDG | HDG | HDG | HDG | HDG | HDG | HDG | HDG | HDG | HDG |
| Neutral salt spray test: | | | | | | | | | | | |
| 216 h | | 2.2 | <1.0 | 1.4 | 1.4 | <1.0 | 1.0 | 2.8 | 2.9 | 2.2 | <1.0 |
| 504 h | | 2.8 | 1.0 | 2.3 | 2.0 | 1.0 | 1.2 | 4.0 | 4.1 | 2.4 | 1.2 |
| 696 h | | 3.1 | 1.9 | 2.3 | 2.3 | 1.4 | 1.6 | >5.0 | 4.6 | 2.5 | 1.9 |
| 1008 h | | 3.5 | 2.4 | 3.3 | 2.7 | 2.2 | 2.3 | n.d. | >5.0 | 3.1 | 2.4 |
| T-Bend Test: | | | | | | | | | | | |
| T0 | | <5 | 5 | 7.5 | 7.5 | 6 | 6 | 18 | <17 | 38 | 20 |
| T1 | | <5 | 5 | <5 | <5 | <5 | <5 | 18 | 15 | 33 | 5 |

TABLE 5

Overview of the coating compositions and properties of coatings based on different pretreatment compositions depending on the amount and type of coprecipitated and anion exchanged LDH particles and on optionally added corrosion inhibitor B

| Addition/Property/ Example | Sample | E11 | E12 | E13 | E14 | E15 | E16 | E17 | E18 | CE19 | E20 |
|---|---|---|---|---|---|---|---|---|---|---|---|
| Aqueous pretreatment base composition | | B1 | B1 | B1 | B1 | B1 | B1 | B1 | B1 | B2 | B2 |
| Concentration of aqu. base composition | | 1% w | 1% w | 1% w | 1% w | 1% w | 1% w | 1% w | 1% w | 1.5% w | 1.5% w |
| $Mg(2)Al(1)$— $VOx$ | A66 | 1% w | — | 1% w | 0.5% w | 1% w | 0.25% w | 0.5% w | 0.5% w | 0 | 1% w |
| $Mg(2)Al(1)$-MBT | A67 | — | 1% w | 1% w | 0.5 % w | 0.25% w | 1% w | 0 | 0 | 0 | 0 |
| Total LDH content | | 1% w | 1% w | 2% w | 1 % w | 1.25% w | 1.25% w | 0.5% w | 0.5% w | 0 | 1% w |
| Additional corrosion inhibitor B = MBT | | — | — | — | — | — | — | — | 0.01% w | — | — |
| Coating weight for Si about . . . mg/m$^2$ | | 7 | 3 | 3  7 | 7  12 | 5 | 10  19 | 12 | 8 | 19 | 16 |
| Paint system | 15 + 20 μm | P1 | P1 | P1 | P1 | P1 | P1 | P1 | P1 | P1 | P1 |
| Metallic surface | | HDG | HDG | HDG | HDG | HDG | HDG | HDG | HDG | HDG | HDG |
| Neutral salt spray test: | | | | | | | | | | | |
| 240 h | | 1.0 | 1.2 | 1.5 | 1.0 | 1.3 | 1.7 | <1 | 1.2 | <1 | <1 |
| 504 h | | 1.5 | 1.7 | 2.6 | 1.4 | 1.7 | 2.7 | 1.8 | 1.7 | <1 | 1.0 |
| 696 h | | 1.7 | 1.9 | 3.4 | 1.5 | 1.9 | 2.9 | 2.0 | 2.3 | 1.0 | 1.1 |
| 1008 h | | 2.9 | 2.9 | 4.8 | 2.3 | 2.8 | 3.0 | 2.9 | 3.5 | 1.3 | 1.6 |
| T-Bend Test: | | | | | | | | | | | |
| T0 | | 6 | 21 | 36 | 60 | <5 | ±11 | 6 | 9 | 14 | 7.5 |
| T1 | | <5 | 7.5 | 15 | 10 | 0 | <5 | 6 | 7 | 11 | 6 |

TABLE 6

Overview of the coating compositions and properties of coatings based on pretreatment composition B1 depending on the type of freshly coprecipitated and optionally anion exchanged LDH particles and on the addition of a stabilizator for E21 to E23

| Addition/Property/Example | Sample | E21 | E22 | E23 | E24 | E25 | E26 | E27 | E28 | E29 | E30 |
|---|---|---|---|---|---|---|---|---|---|---|---|
| Aqueous pretreatment composition | | B1 | B1 | B1 | B1 | B1 | B1 | B1 | B1 | B1 | B1 |
| Concentration of aqu. base composition | | 1% w | 1% w | 1% w | 1% w | 1% w | 1% w | 1% w | 1% w | 1% w | 1% w |
| Zn(2)Al(1)—$VO_x$ VC | A11 | A11 | A11 | A11 | — | — | — | — | — | — | — |
| Zn(2)Al(1)—$H_xPO_4$ | A12 | — | — | — | A12 | — | — | — | — | — | — |
| Zn(2)Al(1)-salicylate | A13 | — | — | — | — | A13 | — | — | — | — | — |
| Mg(3)Al(1)-MBT | A15 | — | — | — | — | — | A15 | — | — | — | — |
| Mg(3)Al(1)—$VO_x$ | A16 | — | — | — | — | — | — | A16 | — | — | — |
| Zn(2)Cr(1)—$MoO_4$ | A17 | — | — | — | — | — | — | — | A17 | — | — |
| Mg/Al/$Ti^{IV}$—$CO_3$ | A30 | — | — | — | — | — | — | — | — | A30 | — |
| Zn/$Zr^{IV}$—$CO_3$ | A33 | — | — | — | — | — | — | — | — | — | A33 |
| Total LDH content | | 1% w | 1% w | 1% w | 1% w | 1% w | 1% w | 1% w | 1% w | 1% w | 1% w |
| Stabilizator addition of . . . % w | | 0 PVP | 0.25 PVP | 0.5 PVP | — | — | — | — | — | — | — |
| Sedimentation | after 8 h | signific. | certain | nearly no | — | — | — | — | — | — | — |
| Coating weight for Si about | mg/m$^2$ | 3 | 4 | 4 | 7—12 | 5 | 10—19 | 12 | 8 | 19 | 16 |
| Paint system | 5 + 20 µm | P1 | P1 | P1 | P1 | P1 | P1 | P1 | P1 | P1 | P1 |
| Metallic surface | | HDG | HDG | HDG | HDG | HDG | HDG | HDG | HDG | HDG | HDG |
| Neutral salt spray test NSS: 240 h | | — | — | — | — | — | — | — | — | — | — |
| T-Bend Test: | | | | | | | | | | | |
| T0 | | — | — | — | — | — | — | — | — | — | — |
| T1 | | — | — | — | — | — | — | — | — | — | — |

TABLE 7

Overview of the coating compositions and properties of coatings based on different pretreatment compositions depending on the type of LDH particles for E31 to E40 and for CE37 and CE39

| Addition/Property/Example | Sample | E31 | E32 | E33 | E34 | E35 | E36 | CE37 | E38 | CE39 | E40 |
|---|---|---|---|---|---|---|---|---|---|---|---|
| Aqueous pretreatment composition | | B1 | B1 | B1 | B1 | B1 | B1 | B3 | B3 | B4 | B4 |
| Concentration of aqu. base composition | | 1% w | 1% w | 1% w | 1% w | 1% w | 1% w | 1% w | 1% w | 1% w | 1% w |
| Fe(2)Al(1)—$CO_3$ | A37 | A37 | — | — | — | — | — | — | — | — | — |
| Mg(2)Al(1)-monoaminophosphonate | A40 | — | A40 | — | — | — | — | — | — | — | — |
| Mg(2)Al(1)-phosphomolybdate | A41 | — | — | A41 | — | — | — | — | — | — | — |
| Mg(2)Al(1)-oxalate | A42 | — | — | — | A42 | — | — | — | — | — | — |
| Mg(2)Al(1)-benzotriazole | A44 | — | — | — | — | A44 | — | — | — | — | — |
| Calc. + rehydr. Mg(3)Al(1) + $MoO_4$ | A52 | — | — | — | — | — | A52 | — | — | — | — |
| Zn(2)Al(1)—$VO_x$ VC | A11 | — | — | — | — | — | — | — | A11 | — | A11 |
| Total LDH content | | 1% w | 1% w | 1% w | 1% w | 1% w | 1% w | 0% w | 1% w | 0% w | 1% w |
| Coating weight for Si about | mg/m$^2$ | 7 | 3 | 3 | 7 | 7 | 12 | 5 | 10 19 | 6 6 | 6 6 |
| Total coating weight about | mg/m$^2$ | — | — | — | — | — | — | — | — | — | — |
| Paint system in µm | 5 + 20 | P1 | P1 | P1 | P1 | P1 | P1 | — | — | — | — |
| Metallic surface | | HDG | HDG | HDG | HDG | HDG | HDG | HDG | HDG | HDG | HDG |
| Neutral salt spray test: | | | | | | | | | | | |
| 20% red rust after about . . . days | | — | — | — | — | — | — | 4 | 3 | 4 | 3 |
| Cross hatch Test DIN EN ISO 2409 1 mm | | — | — | — | — | — | — | — | — | — | — |

TABLE 8

Overview of the coating compositions and properties of coatings based on pretreatment compositions B1 and B5 and passivation compositions B6 and B7 depending on the type of LDH particles

| Addition/Property/Example | Sample | CE41 | E42 | E43 | E44 | E45 | E46 | CE47 | E48 | CE49 | E50 |
|---|---|---|---|---|---|---|---|---|---|---|---|
| Aqueous pretr./passiv. base composition | | B5 | B5 | B1 | B1 | B1 | B1 | B6 | B6 | B7 | B7 |
| Concentration of aqu. base composition | | 1% w | 1% w | 1% w | 1% w | 1% w | 1% w | 1% w | 1% w | 1% w | 1% w |
| Calc. hydrotalcite Mg(3)Al(1) | A51 | — | — | A51 0.5% | A51 1% w | — | — | — | — | — | — |
| Coprecipitated Zn(2)Al(1)—$VO_x$ | A10 | — | — | A10 0.5% | A10 1% w | — | A10 0.5% | — | — | — | — |
| Zn(2)Al(1)—$VO_x$ VC | A11 | — | — | — | — | A11 0.5% | — | — | — | — | — |
| Mg(3)Al(1)-MBT | A15 | — | — | — | — | A15 0.5% | — | — | — | — | — |
| Zn(2)Al(1)-MBT | A68 | — | — | — | — | — | A68 0.5% | — | — | — | — |
| Zn(2)Al(1)—$VO_x$ VC | A11 | — | A11 | — | — | — | — | — | A11 | — | A11 |
| Total LDH content | | 0% w | 1% w | 1% w | 2% w | 1% w | 1% w | 0% w | 1% w | 0% w | 1% w |

TABLE 8-continued

Overview of the coating compositions and properties of coatings based on pretreatment compositions B1 and B5 and passivation compositions B6 and B7 depending on the type of LDH particles

| Addition/Property/Example | Sample | CE41 | E42 | E43 | E44 | E45 | E46 | CE47 | E48 | CE49 | E50 |
|---|---|---|---|---|---|---|---|---|---|---|---|
| Coating weight for Si about | mg/m² | — | — | — | — | 5 | — | — | — | — | — |
| Total coating weight about | mg/m² | — | — | — | — | — | — | 1300 | 1300 | 1300 | 1300 |
| Paint system in μm | 5 + 20 | P1 | P1 | P1 | P1 | P1 | P1 | — | — | — | — |
| Metallic surface | | HDG | HDG | HDG | HDG | HDG | HDG | HDG | HDG | HDG | HDG |
| Neutral salt spray test: | | | | | | | | | | | |
| 20% red rust after about . . . days | | — | — | — | — | — | — | 5 | 4 | about 5 | about 4 |
| Cross hatch Test DIN EN ISO 2409 1 mm | | — | — | — | — | — | — | Gt2 | Gt2 | Gt2 | Gt2 |

TABLE 9

Overview of the coating compositions and properties of coatings based on the non-aqueous primer composition D1 depending on the amount and type of calcined resp. calcined and rehydrated or coprecipitated LDH particles for E52 to E60 and for CE51 and CE56-herein calculated above 100% by weight-the content of the base primer comp. alone is 100% by weight

| Addition/Property/Example | Sample | CE51 | E52 | E53 | E54 | E55 | CE56 | E57 | E58 | E59 | E60 |
|---|---|---|---|---|---|---|---|---|---|---|---|
| Water-free base primer composition | | D1 | D1 | D1 | D1 | D1 | D1 | D1 | D1 | D1 | D1 |
| Concentration of base composition | | 100% w | 100% w | 100% w | 100% w | 100% w | 100% w | 100% w | 100% w | 100% w | 100% w |
| Calc. hydrotalcite Mg(3)Al(1) | A51 | — | A51 | A51 | A51 | A51 | — | — | — | — | — |
| Coprecipitated Zn(2)Al(1)— VOx | A10 | — | — | — | — | — | — | A10 | — | — | — |
| Calc. + rehydr. Mg(3)Al(1) + MoO4 | A52 | — | — | — | — | — | — | — | A52 | A52 | — |
| Calc. + rehydr. Mg(3)Al(1) + MBT | A57 | — | — | — | — | — | — | — | — | — | A57 |
| LDH content | | 0% w | 1% w | 2% w | 4% w | 8% w | 0% w | 1% w | 3.25% w | 6.5% w | 3.7% w |
| Dry film thickness about | μm | 7 | 7 | 7 | 7 | 7 | 3.9 | 4.2 | 4.1 | 3.8 | 4.1 |
| Metallic surface | | EG | EG | EG | EG | EG | EG | EG | EG | EG | EG |
| Neutral salt spray test: | | | | | | | | | | | |
| 10% red rust after about . . . days | | n.d. | n.d. | n.d. | 90 | >>90 | n.d. | n.d. | n.d. | n.d. | n.d. |
| 20% red rust after about . . . days | | 27 | 44 | 63 | >90 | >>120 | <22 | 22 | <36 | ≤41 | 22 |
| Alkaline resistance: Weight loss in % | | — | — | — | — | — | 25 | 24 | 17 | 15 | 20 |
| Chemical resistance: MEK double hubs | | — | — | — | — | — | 32 | 28 | 38 | >50 | 28 |
| Erichsen indentation 6 mm | | — | — | — | — | — | passed | failed | failed | passed | passed |
| Erichsen indentation 8 mm | | — | — | — | — | — | passed | failed | failed | passed | passed |

TABLE 10

Overview of the coating compositions and properties of coatings based on pretreatmentprimer compositions C1 and C2 an aqueous cathodic electrodeposition coating composition E1 depending on the amount and type of LDH particles for E62 to E70 and for CE67 to CE69-herein calculated above 100% by weight with 100% by weight of the base composition

| Addition/Property/Example | Sample | CE61 | E62 | E63 | E64 | E65 | E66 | CE67 | E68 | CE69 | E70 |
|---|---|---|---|---|---|---|---|---|---|---|---|
| Base composition | | C1 | C1 | C1 | C1 | C1 | C1 | C2 | C2 | E1 | E1 |
| Concentration of base composition | | 100% w | 100% w | 100% w | 100% w | 100% w | 100% w | 100% w | 100% w | 100% w | 100% w |
| Calc. hydrotalcite Mg(3)Al(1) | A51 | — | A51 | — | — | — | — | — | — | — | — |
| Calc. + rehydr. Mg(3)Al(1) + MoO4 | A52 | — | — | A52 | — | — | — | — | — | — | — |
| Calc. + rehydr. Mg(3)Al(1) + MBT | A57 | — | — | — | A57 | — | — | — | — | — | — |
| Coprecipit. Zn(2)Al(1)— VOₓ VC | A11 | — | — | — | — | A11 | — | — | A11 | — | A11 |
| Coprecipit. Mg(3)Al(1)-MBT | A15 | — | — | — | — | — | A15 | — | — | — | — |
| LDH content | | 0% w | 3.85% w | 5% w | 5% w | 4% w | 4% w | 0% w | 4% w | 0% w | 4% w |
| Dry film thickness about | μm | 1 | 1 | 1 | 1 | 1 | 1 | 8 | 8 | 38 | 38 |
| Metallic surface | | GA | GA | GA | GA | HDG | HDG | HDG | HDG | HDG | HDG |
| Neutral salt spray test: | | | | | | | | | | | |
| 240 h white rust in % | | 25 | <2 | 15 | <5 | <10 | <10 | — | — | — | — |
| 10% red rust after about . . . days | | — | — | — | — | — | — | 16 | 14 | — | — |
| Salt spray test DIN 50021 SS: 1008 h | | — | — | — | — | — | — | — | — | 4.5 | 3.5 |
| KK Test: white rust in %: | | | | | | | | | | | |
| 1080 h | | passed | passed | passed | passed | — | — | — | — | — | — |
| 1680 h | | passed | passed | failed | failed | — | — | — | — | — | — |

TABLE 11

Overview of the coating compositions and properties of coatings based on the aqueous paint compositions D2 and D3 depending on the type of coprecipitated LDH particles for E72 to E80 and for CE71 and CE78

| Addition/Property/Example | Sample | CE71 | E72 | E73 | E74 | E75 | E76 | E77 | CE78 | E79 | E80 |
|---|---|---|---|---|---|---|---|---|---|---|---|
| Primer composition | | D2 | D2 | D2 | D2 | D2 | D2 | D2 | D3 | D3 | D3 |
| Zn(2)Al(1) | A1 | — | A1 | — | — | — | — | — | — | A1 | — |
| Zn(2)Al(1)— VOx | A10 | — | — | A10 | — | — | — | — | — | — | A10 |
| Zn(2)Al(1)-MBT | A68 | — | — | — | A68 | — | — | — | — | — | — |
| Mg(3)Al(1) | A5 | — | — | — | — | A5 | — | — | — | — | — |
| Mg(3)Al(1)— VOx | A16 | — | — | — | — | — | A16 | — | — | — | — |
| Mg(3)Al(1)-MBT | A15 | — | — | — | — | — | — | A15 | — | — | — |
| LDH content | | 0% w | 5% w | 5% w | 5% w | 5% w | 5% w | 5% w | 0% w | 5% w | 5% w |
| Dry film thickness about | μm | 20 | 20 | 20 | 20 | 20 | 20 | 20 | 20 | 20 | 20 |
| Metallic surface and prior treatment varied | | A) | A) | A) | A) | A) | A) | A) | A) | A) | A) |
| Salt spray test ISO 9227 3000 h/Creepage | | 1.2 mm | 0.6 mm | 0.2 mm | 0.8 mm | 0.4 mm | 0.3 mm | 0.8 mm | 3.0 mm | 2.1 mm | 1.3 mm |
| Salt spray test ISO 9227 3000 h/Blistering | | passed | passed | passed | passed | passed | passed | passed | passed | passed | passed |
| Filiform Test DIN EN 3665 1 + 1000 h | | 3.0 mm | 2.0 mm | 1.5 mm | 1.3 mm | 2.8 mm | 1.8 mm | 1.8 mm | 4.0 mm | 3.0 mm | 2.5 mm |
| Adhesion Test DIN EN ISO 2409 | | passed | passed | passed | passed | passed | passed | passed | passed | passed | passed |
| Mandrel bend test ISO 1519, 2 mm diam. | | passed | passed | passed | passed | passed | passed | passed | passed | passed | — |
| Scratch Hardness Erichsen indent. 1 mm | | passed | passed | passed | passed | passed | passed | passed | passed | passed | passed |
| Storage in water | | passed | passed | passed | passed | passed | passed | passed | passed | passed | passed |
| Storage in skydrol | | passed | passed | passed | passed | passed | passed | passed | — | — | — |

TABLE 12

Overview of the coating compositions and properties of coatings based on the aqueous primer composition D3 resp. paint compositions F1 and F2 depending on the type of coprecipitated LDH particles for E81 to E88 and compared with CE85 and CE87 as well as with CE78 of Table 11

| Addition/Property/Example | Sample | E81 | E82 | E83 | E84 | CE85 | E86 | CE87 | E88 |
|---|---|---|---|---|---|---|---|---|---|
| Primer composition | | D3 | D3 | D3 | D3 | F1 | F1 | F2 | F2 |
| Zn(2)Al(1)-MBT | A68 | A68 | — | — | — | — | A68 | — | — |
| Mg(3)Al(1) | | — | — | A5 | — | — | — | — | — |
| Mg(3)Al(1)— VOx | A16 | — | — | — | A16 | — | — | — | — |
| Mg(3)Al(1)-MBT | | — | — | — | — | A15 | — | — | A15 |
| LDH content | % w | 5% w | 5% w | 5% w | 5% w | 0% w | 5% w | 0% w | 5% w |
| Dry film thickness about | 20 | 20 | 20 | 20 | 20 | 20 | 20 | 20 | 20 |
| Metallic surface and prior treatment varied | | A) | A) | A) | A) | A1) | A1) | A1) | A1) |
| Conventional primer coating of 20 μm | | — | — | — | — | — | C) | C) | C) |
| Salt spray test ISO 9227 3000 h/Creepage | | 1.9 mm | 2.0 mm | 1.3 mm | 1.8 mm | 2.6 mm | 2.0 mm | 2.5 mm | 2.0 mm |
| Salt spray test ISO 9227 3000 h/Blistering | | passed | passed | passed | passed | passed | passed | passed | passed |
| Filiform Test DIN EN 3665 1 + 1000 h | | 1.9 mm | 3.0 mm | 1.9 mm | 2.1 mm | 4.5 mm | 2.5 mm | 3.5 mm | 2.2 mm |
| Adhesion Test DIN EN ISO 2409 | | passed | passed | passed | passed | passed | passed | passed | passed |
| Mandrel bend test ISO 1519, 2 mm diam. | | passed | passed | — | passed | — | — | — | — |
| Scratch Hardness Erichsen indent. 1 mm | | passed | passed | — | passed | — | — | — | — |
| Storage in water | | passed | passed | passed | passed | passed | passed | passed | passed |

TABLE 13

Overview of coating systems of 2 resp. of 3 coatings produced with different types of compositions one after the other and of the coatings' properties of these coating systems for E90 to E98 in comparison to CE89 to CE96

| Addition/Property/Example | Sample | CE89 | E90 | CE91 | E92 | E93 | CE94 | E95 | CE96 | E97 | E98 |
|---|---|---|---|---|---|---|---|---|---|---|---|
| Metallic surface | | A1) | A1) | A1) | A1) | A1) | A1) | A1) | A1) | A1) | A1) |
| Pretreatment composition | | B5 | — | B5 | — | — | B5 | — | B5 | — | — |
| Pretreatment composition with 1% w A11 | | — | B5 | — | B5 | B5 | — | B5 | — | B5 | B5 |
| Primer composition | | D2 | — | D2 | — | — | D3 | — | D3 | — | — |
| Primer composition with 5% w A16 | | — | D2 | — | D2 | D2 | — | D3 | — | D3 | D3 |
| Topcoat composition | | — | — | F2 | F2 | — | — | F2 | F2 | F2 | — |
| Topcoat composition with 3% w A68 | | — | — | — | — | F2 | — | — | — | — | F2 |
| Total LDH content | | 0% w | 6% w | 0% w | 6% w | 9% w | 0% w | 6% w | 0% w | 6% w | 9% w |
| Total thickness of dry films about | μm | 20 | 20 | 50 | 50 | 50 | 20 | 20 | 50 | 50 | 50 |
| Salt spray test ISO 9227 3000 h/Creepage | | 2.7 mm | 2.0 mm | 2.5 mm | 2.0 mm | 1.6 mm | 3.1 mm | 2.4 mm | 2.9 mm | 2.1 mm | 1.9 mm |
| Salt spray test ISO 9227 3000 h/Blistering | | passed | passed | passed | passed | passed | passed | passed | passed | passed | passed |
| Filiform Test DIN EN 3665 1 + 1000 h | | 5.6 mm | 2.5 mm | 4.5 mm | 2.5 mm | 1.8 mm | 5.0 mm | 2.6 mm | 4.4 mm | 2.1 mm | 1.9 mm |
| Adhesion Test DIN EN ISO 2409 | | passed | passed | passed | passed | passed | passed | passed | passed | passed | passed |

In performing the examples of Table 9, it was very astonishing that the calcined non-rehydrated LDH particles lead unexpectedly to very high corrosion resistance results on electrogalvanized steel surfaces (EG) in the examples E52 to E55, here in a non-aqueous primer composition.

Astonishingly, calcined non-rehydrated and not specifically with anions loaded LDH particles were added in example E62 of Table 10 to an aqueous pretreatmentprimer composition, which gave unexpectedly excellent results. Therefore, it is expected that the calcined LDH particles have been partially, but not completely been reconstructed by rehydration in the time scale of coating preparation in the aqueous dispersion C1. These LDH particles seem to be able to be effective as chloride and water nanotraps. As chloride anions are the most dangerous anions for corrosion, these calcined LDH particles seem to be very useful.

It was astonishingly observed and in experiments confirmed that such calcined non-rehydrated LDH particles are effective as water nanotraps and as chloride nanotraps.

In Table 10, the Galvalume® coated steel sheets, which were coated with a commercial and excellent coating composition additionally containing LDH particles, astonishingly showed a high improvement of the corrosion resistance in the NSS test, starting already from a high level of corrosion resistance without such LDH particles. Herein, it has to be noted that the coating thickness of the aqueous primer composition was only of 1±0.2 µm and that such excellent results were gained without using a pretreatment coating below it.

Although several coating properties in Tables 11 to 13 have passed the requirements well, the quantified data for paint adhesion and corrosion resistance clearly show an improvement with the amount of LDH particles resp. with the number of coatings of a coating system containing LDH particles.

In Tables 11 to 13, the aluminium alloy AA2024 is coated with a coating of an aqueous epoxy or polyurethane primer composition resp. with a coating system. The typical paint tests like adhesion and scratch resistance show for LDH-containing compositions resp. coatings excellent results. The creepage in filiform corrosion tests and in salt-spray tests is significantly lower for a LDH containing coating resp. coating system compared with a standard chromate-free coating resp. coating system containing no LDH particles.

The creepage in filiform corrosion tests and in salt-spray tests is significantly lower when testing a LDH containing coating resp. coating system compared with a standard chromate-free coating resp. coating system containing no LDH particles. The results gained with the epoxy primer composition D2 shows a bit better results than with the polyurethane primer D3.

For all kinds of coating compositions, it could be found that the addition of a certain amount of LDH particles to these coating compositions is significantly helpful to further improve the corrosion resistance of already well corrosion resistant coatings. Here, it has to be noted that the coating compositions and the thereof generated coatings are already highly corrosion resistant without addition of LDH particles. Therefore, no further improvement could be expected, which nevertheless was established. In the cases where a further organic composition was applied later on, even the paint adhesion has been improved.

For pretreatment compositions of a bath, it has been found to be often advantageous not to add more than about 6 or more than about 3% by weight of LDH particles, which of course may depend on the specific properties of such nanoparticles. Sometimes, an optimum addition has been identified in the range of about 0.5 to about 2% by weight of LDH particles for aqueous systems. For pretreatment compositions, it has been found to be often advantageous to add LDH particles that are a bit smaller than for primer, for pretreatmentprimer or for electrocoating compositions.

For primer compositions of a bath, it has been found to be often advantageous not to add more than about 12 or more than about 8% by weight of LDH particles, which of course may depend on the specific properties of such nanoparticles. Sometimes, an optimum addition has been identified to be in the range of about 2 to about 6% by weight of LDH particles for aqueous systems.

For primer compositions or coatings, it has been further on found that there is often an optimum performance in corrosion protection in the range of from 3 to 6% by weight of LDH particles. If there would be used a higher content than 10% by weight of LDH particles, this may not bring any more advantage. The results are dependent on the type of LDH particles and of the inhibiting anions.

For paint compositions or coatings generated thereof, especially for topcoats, it has been found that the beneficial effect of a single topcoat may be lower than for coatings generated from primer compositions.

For the coatings' systems, it has been found that the positive effects for at least two coatings containing LDH particles is clearly improved in comparison to the use of only one coating containing LDH particles of the corresponding coatings' system. Furthermore, the higher the total inhibitor loading capacity of the coatings' systems is, it is expected to provide higher long-term protection performance.

The work leading to this invention has received funding from the European Community's Seventh Framework Programme under agreement no. FP7-214261.

The invention claimed is:

1. A process of increasing corrosion resistance of a corrosion resistant coating directly on a metallic surface, said process comprising:
including in a corrosion resistant coating particles on a base of at least one layered double hydroxide (LDH) phase characterized by the general formula [1], $$[M^{2+}_{(1\pm0.5)-x}(M^{3+},M^{4+})_x(OH)_{2\pm0.75}]A^{n-}_{x/n}\cdot mH_2O \qquad [1],$$
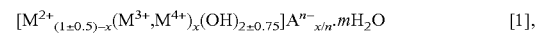

wherein $M^{2+}$, $M^{3+}$ and $M^{4+}$ are divalent, trivalent, tetravalent cations, respectively, selected from the group consisting of $Ca^{2+}$, $Co^{2+}$, $Cu^{2+}$, $Fe^{2+}$, $Mg^{2+}$, $Mn^{2+}$, $Ni^{2+}$, $Zn^{2+}$, $Al^{3+}$, $Ce^{3+}$, $Co^{3+}$, $Cr^{3+}$, $Fe^{3+}$, $Ga^{3+}$, $V^{3+}$, $Si^{4+}$, $Sn^{4+}$, $Ti^{4+}$ and $Zr^{4+}$, wherein one of $M^{3+}$ and $M^{4+}$ may be optionally absent, wherein x is the ratio $(M^{3+}+M^{4+})/(M^{2+}+M^{3+}+M^{4+})$ and is in a range of from 0.1 to 0.5, wherein $A^{n-}$ indicates an overall negative charge of intercalated species A with n being in a range of from 0.1 to 100, wherein species A is an anion and/or a molecule including at least one anion, said anion or at least one anion being selected from the group consisting of a hydroxide, a fluoride, a nitrate, a sulfate, a chromate, a chromite, a molybdate, a phosphomolybdate, a phosphate, a phosphonate, a tungstate, a vanadate, an azole, a carboxylate, a dodecylbenzene, a phenolic compound, an anionic surfactant and a biomolecule;

said particles optionally being at least one of an at least partially calcined form of said particles, an at least partially calcined and then rehydrated form of said particles, or a totally calcined and then rehydrated form of said particles, said particles optionally including at least one mixture of substances including an oxide, a double oxide, a multiple oxide, or a hydroxide, at least one LDH phase, and an anion A or a molecule including at least one anion A, wherein said metallic surface is an iron-based substrate or an aluminium alloy.

2. The process according to claim 1, wherein the anion or at least one anion is selected from the group consisting of a hydroxide, a nitrate, a sulfate, a molybdate, a phosphate, a phosphomolybdate, a vanadate, a carboxylic acid anion and an azole.

3. The process according to claim 1, wherein the anion or molecule is selected from the group consisting of at least one of a complex fluoride, a chromate, a chromite, a molybdate, a phosphomolybdate, a phosphate, a phosphonate, a tungstate, a vanadate, an azole, a carboxylate, a dodecylbenzene and a phenolic compound.

4. The process according to claim 3 wherein the azole is a benzothiazole, a 2-thiazoline, a benzotriazoles or benzimidazoles.

5. The process according to claim 3 wherein the carboxylate is a benzoate, a fumarate, a lactate, an octanoate, an oxalate, a phthalate, a salicylate or a succinates.

6. The process according to claim 1, wherein species A may be released from the LDH particles into the coating or into the surrounding of the LDH particles in the coating.

7. The process according to claim 1, wherein water and/or corrosive anions are incorporated into the LDH particles during an up-take from the surrounding of the LDH particles.

8. The process according to claim 1, wherein the coating comprises at least one particulate LDH phase and at least one constituent each selected from the group consisting of silane/silanol/siloxane, water glass, titanium compound, zirconium compound and organic polymer/copolymer.

9. The process according to claim 8, wherein the water glass is a water glass on the base of sodium, potassium and/or lithium.

10. The process according to claim 8, wherein the silane/silanol/siloxane is based on at least one Si compound comprises at least one amino, at least one imino and/or at least one ureido group per molecule.

11. The process according to claim 8, wherein the titanium compound and/or the zirconium compound are at least one compound selected from an acetylacetonate, a carbonate, a citrate, a complex fluoride or a lactate.

12. The process according to claim 1, wherein the coating comprises at least one corrosion inhibitor B.

13. The process according to claim 1, wherein the coating contains calcined LDH particles.

14. The process according to claim 1, wherein the coating further comprises at least one surface modifying agent for dispersing, for anti-settling, for stabilizing and/or for long-term stabilizing of the coating and/or of its components and/or further comprises at least one agent for modifying the structural viscosity and/or thixotropy of the coating.

15. The process according to claim 1 wherein the azole is a benzothiazole, a 2-thiazoline, a benzotriazoles or benzimidazoles.

16. The process according to claim 1 wherein the carboxylate is a benzoate, a fumarate, a lactate, an octanoate, an oxalate, a phthalate, a salicylate or a succinates.

17. The process according to claim 1 wherein the iron-based substrate is a steel, a zinc coated steel, or an aluminium coated steel.

18. The process of claim 17 wherein the steel is a cold-rolled steel, a hot-dip galvanized steel or an electronically galvanized steel.

19. The process of claim 1 wherein the at least partially calcined form of said particles, the at least partially calcined and then rehydrated form of said particles, or the totally calcined and then rehydrated form of said particles, have been subjected to anion exchange during preparation.

20. The process of claim 1 wherein when $Mg^{2+}$ is present as a divalent cation with $Zn^{2+}$ and/or $Ca^{2+}$ as the only other divalent cations in the LDH of general formula [1], A is not hydroxide or chromate; and wherein when $Mg^{2+}$, $Zn^{2+}$ and/or $Ca^{2+}$ are the only divalent cations in the LDH of general formula [1], A is not phosphate or sulfate.

21. A process of increasing corrosion resistance of a metallic surface comprising applying a corrosion resistant coating directly on the metallic surface, said metallic surface being an iron-based substrate or an aluminium alloy, said corrosion resistant coating particles being on a base of at least one layered double hydroxide (LDH) phase characterized by the general formula [1], $$[M^{2+}{}_{(1\pm0.5)-x}(M^{3+},M^{4+})_x(OH)_{2\pm0.75}]A^{n-}{}_{x/n}\cdot mH_2O \qquad [1],$$

wherein $M^{2+}$, $M^{3+}$ and $M^{4+}$ are divalent, trivalent, tetravalent cations, respectively, selected from the group consisting of $Ca^{2+}$, $Co^{2+}$, $Cu^{2+}$, $Fe^{2+}$, $Mg^{2+}$, $Mn^{2+}$, $Ni^{2+}$, $Zn^{2+}$, $Al^{3+}$, $Ce^{3+}$, $Co^{3+}$, $Cr^{3+}$, $Fe^{3+}$, $Ga^{3+}$, $V^{3+}$, $Si^{4+}$, $Sn^{4+}$, $Ti^{4+}$ and $Zr^{4+}$, wherein one of $M^{3+}$ and $M^{4+}$ may be optionally absent, wherein x is the ratio $(M^{3+}+M^{4+})/(M^{2+}+M^{3+}+M^{4+})$ and is in a range of from 0.1 to 0.5, wherein $A^{n-}$ indicates an overall negative charge of intercalated species A with n being in a range of from 0.1 to 100, wherein species A is an anion and/or a molecule including at least one anion, said anion or at least one anion being selected from the group consisting of a hydroxide, a fluoride, a nitrate, a sulfate, a chromate, a chromite, a molybdate, a phosphomolybdate, a phosphate, a phosphonate, a tungstate, a vanadate, an azole, a carboxylate, a dodecylbenzene, a phenolic compound, an anionic surfactant and a biomolecule;

said particles optionally being at least one of an at least partially calcined form of said particles, an at least partially calcined and then rehydrated form of said particles, or a totally calcined and then rehydrated form of said particles, said particles optionally including at least one mixture of substances including an oxide, a double oxide, a multiple oxide, or a hydroxide, at least one LDH phase, and an anion A or a molecule including at least one anion A.

22. The process of claim 21 wherein the iron-based substrate is a steel, a zinc coated steel, or an aluminium coated steel.

23. The process of claim 22 wherein the steel is a cold-rolled steel, a hot-dip galvanized steel or an electronically galvanized steel.

24. The process of claim 1 wherein the at least partially calcined form of said particles, the at least partially calcined and then rehydrated form of said particles, or the totally calcined and then rehydrated form of said particles, have been subjected to anion exchange during preparation.

25. The process of claim 21 wherein when $Mg^{2+}$ is present as a divalent cation with $Zn^{2+}$ and/or $Ca^{2+}$ as the only other divalent cations in the LDH of general formula [1], A is not hydroxide or chromate; and wherein when $Mg^{2+}$, $Zn^{2+}$ and/or Ca$^{2+}$ are the only divalent cations in the LDH of general formula [1], A is not phosphate or sulfate.

26. A process of increasing corrosion resistance of a corrosion resistant coating on a metallic surface, wherein the metallic surface is an aluminium alloy, said surface optionally including a coating, said process comprising:

including in a corrosion resistant coating particles on a base of at least one layered double hydroxide (LDH) phase characterized by the general formula [1], $$[M^{2+}{}_{(1\pm 0.5)-x}(M^{3+},M^{4+})_x(OH)_{2\pm 0.75}]A^{n-}{}_{x/n}\cdot mH_2O \qquad [1],$$

wherein M$^{2+}$, M$^{3+}$ and M$^{4+}$ are divalent, trivalent, tetravalent cations, respectively, selected from the group consisting of Ca$^{2+}$, Co$^{2+}$, Cu$^{2+}$, Fe$^{2+}$, Mg$^{2+}$, Mn$^{2+}$, Ni$^{2+}$, Zn$^{2+}$, Al$^{3+}$, Ce$^{3+}$, Co$^{3+}$, Cr$^{3+}$, Fe$^{3+}$, Ga$^{3+}$, V$^{3+}$, Si$^{4+}$, Sn$^{4+}$, Ti$^{4+}$ and Zr$^{4+}$, wherein one of M$^{3+}$ and M$^{4+}$ may be optionally absent, wherein x is the ratio (M$^{3+}$+M$^{4+}$)/(M$^{2+}$+M$^{3+}$+M$^{4+}$) and is in a range of from 0.1 to 0.5, wherein A$^{n-}$ indicates an overall negative charge of intercalated species A with n being in a range of from 0.1 to 100, wherein species A is an anion and/or a molecule including at least one anion, said anion or at least one anion being selected from the group consisting of a hydroxide, a fluoride, a nitrate, a sulfate, a chromate, a chromite, a molybdate, a phosphomolybdate, a phosphate, a phosphonate, a tungstate, a vanadate, an azole, a carboxylate, a dodecylbenzene, a phenolic compound, an anionic surfactant and a biomolecule;

said particles optionally being at least one of an at least partially calcined form of said particles, an at least partially calcined and then rehydrated form of said particles, or a totally calcined and then rehydrated form of said particles, said particles optionally including at least one mixture of substances including an oxide, a double oxide, a multiple oxide, or a hydroxide, at least one LDH phase, and an anion A or a molecule including at least one anion A.

27. The process of claim 26 wherein the at least partially calcined form of said particles, the at least partially calcined and then rehydrated form of said particles, or the totally calcined and then rehydrated form of said particles, have been subjected to anion exchange during preparation.

28. A process of increasing corrosion resistance of a metallic surface comprising applying a corrosion resistant coating on the metallic surface, said metallic surface being an aluminum alloy, said surface optionally including a coating, said corrosion resistant coating comprising particles being on a base of at least one layered double hydroxide (LDH) phase characterized by the general formula [1], $$[M^{2+}{}_{(1\pm 0.5)-x}(M^{3+},M^{4+})_x(OH)_{2\pm 0.75}]A^{n-}{}_{x/n}\cdot mH_2O \qquad [1],$$

wherein M$^{2+}$, M$^{3+}$ and M$^{4+}$ are divalent, trivalent, tetravalent cations, respectively, selected from the group consisting of Ca$^{2+}$, Co$^{2+}$, Cu$^{2+}$, Fe$^{2+}$, Mg$^{2+}$, Mn$^{2+}$, Ni$^{2+}$, Zn$^{2+}$, Al$^{3+}$, Ce$^{3+}$, Co$^{3+}$, Cr$^{3+}$, Fe$^{3+}$, Ga$^{3+}$, V$^{3+}$, Si$^{4+}$, Sn$^{4+}$, Ti$^{4+}$, and Zr$^{4+}$, wherein one of M$^{3+}$ and M$^{4+}$ may optionally be absent, wherein x is the ratio (M$^{3+}$+M$^{4+}$)/(M$^{2+}$+M$^{3+}$+M$^{4+}$) and is in a range of from 1.0 to 0.5, wherein A$^{n-}$ indicates an overall negative charge of intercalated species A with n being in the range of from 0.1 to 100, wherein species A is an anion and/or a molecule including at least one anion, said anion or at least one anion being selected from the group consisting of a hydroxide, a fluoride, a nitrate, a sulfate, a chromate, a chromite, a molybdate, a phosphomolybdate, a phosphate, a phosphonate, a tungstate, a vanadate, an azole, a carboxylate, a dodecylbenzene, a phenolic compound an anionic surfactant and a biomolecule;

said particles optionally being at least one of an at least partially calcined form of said particles, an at least partially calcined and then rehydrated form of said particles, or a totally calcined and then rehydrated form of said particles, said particles optionally including at least one mixture of substances including an oxide, a double oxide, a multiple oxide, or a hydroxide, at least one LDH phase, and an anion A or a molecule including at least one anion A.

29. The process of claim 28 wherein the at least partially calcined form of said particles, the at least partially calcined and then rehydrated form of said particles, or the totally calcined and then rehydrated form of said particles, have been subjected to anion exchange during preparation.

* * * * *